US009306218B2

(12) United States Patent
Pyun et al.

(10) Patent No.: US 9,306,218 B2
(45) Date of Patent: Apr. 5, 2016

(54) HIGH SULFUR CONTENT COPOLYMERS AND COMPOSITE MATERIALS AND ELECTROCHEMICAL CELLS AND OPTICAL ELEMENTS USING THEM

(75) Inventors: Dong-Chul Pyun, Tucson, AZ (US); Jared J. Griebel, Tucson, AZ (US); Woo Jin Chung, Tucson, AZ (US); Richard Glass, Tucson, AZ (US); Robert A. Norwood, Tucson, AZ (US); Roland Himmelhuber, Tucson, AZ (US); Adam G. Simmonds, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 53 days.

(21) Appl. No.: 14/237,659

(22) PCT Filed: Aug. 13, 2012

(86) PCT No.: PCT/US2012/050602
§ 371 (c)(1),
(2), (4) Date: Mar. 11, 2014

(87) PCT Pub. No.: WO2013/023216
PCT Pub. Date: Feb. 14, 2013

(65) Prior Publication Data
US 2014/0199592 A1  Jul. 17, 2014

Related U.S. Application Data

(60) Provisional application No. 61/574,903, filed on Aug. 11, 2011, provisional application No. 61/574,957, filed on Aug. 12, 2011, provisional application No. 61/685,847, filed on Mar. 26, 2012.

(51) Int. Cl.
*C08G 75/16* (2006.01)
*H01M 4/60* (2006.01)
(Continued)

(52) U.S. Cl.
CPC ............. *H01M 4/602* (2013.01); *H01M 4/043* (2013.01); *H01M 4/0404* (2013.01); *H01M 4/382* (2013.01); *H01M 4/604* (2013.01); *H01M 10/052* (2013.01); *Y02E 60/122* (2013.01)

(58) Field of Classification Search
CPC ................................. C08G 75/14; C08G 75/16
USPC ........................................................ 528/389
See application file for complete search history.

(56) References Cited

U.S. PATENT DOCUMENTS 2,779,761 A * 1/1957 Kibler ............................ 544/85
3,251,797 A * 5/1966 De Pugh et al. ............. 524/392

(Continued)

FOREIGN PATENT DOCUMENTS

| EP | 1882713 | 1/2008 |
| EP | 2093605 | 8/2009 |
| GB | 1203577 A | 8/1970 |

OTHER PUBLICATIONS

Woo et al. Nature Chemistry. Jun. 2013. vol. 5, pp. 518-524. Published online Apr. 14, 2013.*

(Continued)

*Primary Examiner* — Michael A Salvitti
(74) *Attorney, Agent, or Firm* — Nguyen & Tarbet Patent Law Firm

(57) ABSTRACT

The present invention relates generally to high sulfur content polymeric materials and composites, methods for making them, and devices using them such as electrochemical cells and optical elements. In one aspect, a polymeric composition comprising a copolymer of sulfur, at a level in the range of at least about 50 wt % of the copolymer, and one or more monomers each selected from the group consisting of ethylenically unsaturated monomers, epoxide monomers, and thiirane monomers, at a level in the range of about 0.1 wt % to about 50 wt % of the copolymer.

36 Claims, 15 Drawing Sheets

(51) Int. Cl.
*H01M 4/38* (2006.01)
*H01M 10/052* (2010.01)
*H01M 4/04* (2006.01)

(56) References Cited

U.S. PATENT DOCUMENTS

| | | | | |
|---|---|---|---|---|
| 4,238,585 | A | * 12/1980 | Bertozzi | 525/535 |
| 4,346,191 | A | * 8/1982 | Blount | 524/710 |
| 5,362,493 | A | 11/1994 | Skotheim et al. | |
| 6,111,030 | A | * 8/2000 | Hartman et al. | 525/420 |
| 2001/0047043 | A1 | * 11/2001 | Okoroafor et al. | 522/31 |
| 2007/0253772 | A1 | 11/2007 | Kubo et al. | |
| 2013/0064904 | A1 | 3/2013 | Gojon-Romanillos et al. | |
| 2014/0110881 | A1 | * 4/2014 | Keledjian et al. | 264/241 |
| 2014/0199592 | A1 | * 7/2014 | Pyun et al. | 429/213 |

OTHER PUBLICATIONS

Nishide, et al. (2008) Science, 319, 737.
Nishide, et al., (2009), Adv Mater, 21, 1627.
Tarascon, et al. (2010) Phil Trans R Soc A, 368, 3227.
Pyun, J. Angew. Chem. Int. Ed., 2011, 50, 11409-11412.
Rotinjanz, et al. (1908) Z. Physik Chem, 62, 609.
Bacon, et al. (1943) J Am Chem Soc, 65, 639.
Eyring, et al. (1943) J Am Chem 65, 648.
Tobolsky, A. V.; Eisenberg, A. J. Am. Chem. Soc.1959, 81, 780.
Penczek, et al. (1974) Nature, 273, 738.
Nazar et al., Nature Mater. 2009, 8, 500-506.
Scrosati, et al. Angew. Chem. Int. Ed. 2010, 49, 2371-2374.
Chen, et al., J. Phys. Chem. C 2011, 115, 6057-6063.
Yang, et al., ACS Nano 2011, 5, 9187-9193.
Bartlett, et al., (1956) J Am Chem Soc, 78, 3710.
Mcgrath, et al. (2006) Polymer, 47, 4042.
Ueda et al., (2009) J Mater Chem, 19, 8907.
International Search Report PCT/US2012/050602, mailed Jan. 23, 2013.
Chung, et al. (2011) "Elemental Sulfure as a Reactive Medium for Gold Nanoparticules and Nanocomposite Materials," Angew Chem Int, 50, 11409-12.
Trofimov, et al. (2002) "Sulfur-rich copolymers of sulfur with 5-vinylbicyclo hept-2-ene and tricyclo deca-3,8-diene as prospective cathode materials for lithium cells," Sufur Letters, 25: 219-227.
Ning, et al., (2004) "Novel cathode material based on chloropolystyrene," PMSE Preprints, American Chemical Society 90: 396-397.
Wang, et al., Nano Lett. 2011, 11, 2644-2647.
Zheng, et al., Nano Lett. 2011, 11, 4462-4467.
Li, et al., Proc. Natl. Acad. Sci. U.S.A. 2013, 110, 7148-7153.
Zheng, et al., Nano Lett. 2013, 13, 1265-1270.
Zhou, et al., ACS Nano 2013, 7, 8801-8808.
Seh, et al., Nat. Commun. 2013, 4.
Li, et al., Nano Lett. 2013, 13, 5534.
Liu, et al., Nat. Nanotech. 2014, 9, 187.
Wurthner, F., "Perylene bisimide dyes as versatile building blocks for functional supramolecular architectures", Chem. Commun. 2004, 1564-1579.
Asmus, K.-D., "Pulse Radiolysis Methodology", Methods in Enzymology 1984, 105, 167-178.

* cited by examiner

HIGH SULFUR CONTENT COPOLYMERS AND COMPOSITE MATERIALS AND ELECTROCHEMICAL CELLS AND OPTICAL ELEMENTS USING THEM

CROSS-REFERENCE TO RELATED APPLICATIONS

The present application claims the priority of U.S. Provisional Patent Application Ser. No. 61/574,903, filed Aug. 11, 2011; 61/574,957, filed Aug. 12, 2011; and 61/685,847, filed Mar. 26, 2012, each of which is hereby incorporated herein by reference in its entirety.

BACKGROUND OF THE INVENTION

1. Field of the Invention

The present invention relates generally to high sulfur content polymeric materials and composites, methods for making them, and devices using them such as electrochemical cells and optical elements.

2. Technical Background

Elemental sulfur is produced in vast quantities (millions of tons annually) by the petrochemical industry as a by-product from the hydrodesulfurization of oil. Current industrial utilization of elemental sulfur is centered around sulfuric acid, agrochemicals, and vulcanization of rubber. Nonetheless, abundant sulfur remains and is stockpiled. While sulfur feedstocks are plentiful, sulfur is difficult to process. $S_8$, for example, is a brittle, intractable, crystalline solid having poor solid state mechanical properties, poor solution processing characteristics, and a limited slate of synthetic methodologies developed for it.

Elemental sulfur has been explored for use in lithium-sulfur electrochemical cells. Sulfur can oxidize lithium when configured appropriately in an electrochemical cell, and is known to be a very high energy density cathode material. However, electrical limitations of pure elemental sulfur, such as low cycle stability and poor conductivity) have limited the development of this technology. For example, one key limitation of lithium-sulfur technology is the ability to retain high charge capacity for extended cycle lifetimes. Cells based on current lithium ion technology has low capacity (180 mAh/g) but can be cycled for 500-1000 cycles. Lithium-sulfur cells based on elemental sulfur have very high initial charge capacity (in excess of 1200 mAh/g, but their capacity drops to below 400 mAh/g within the first 100-500 cycles. Thus, materials that can provide extended cycle lifetime while retaining reasonable charge capacity are desired.

There have been several recent attempts to form sulfur into nanomaterials for use as cathodes in lithium-sulfur electrochemical cells, such as impregnation into mesoporous carbon materials, encapsulation with graphenes, encapsulation into carbon spheres, and encapsulation into conjugated polymer spheres. While these examples demonstrate that the encapsulation of elemental sulfur with a conductive colloidal shell in a core/shell colloid can enhance electrochemical stability, these synthetic methods are challenging to implement for industrial scale performance. Hence, a new family of inexpensive, but functional materials obtained by practical methods is desirable.

SUMMARY OF THE INVENTION

One aspect of the invention is a polymeric composition including a copolymer of sulfur, at a level in the range of at least about 50 wt % of the copolymer; and one or more monomers each selected from the group consisting of ethylenically unsaturated monomers, epoxide monomers, and thiirane monomers, at a level in the range of about 0.1 wt % to about 50 wt % of the copolymer.

Another aspect of the invention is a method of making a polymeric composition as described herein, the method including heating a mixture comprising sulfur and one or more monomers, for example, at a temperature in the range of about 160° C. to about 230° C.

Another aspect of the invention is a method for making an article formed from the polymeric composition as described herein, the method including heating a mixture comprising sulfur and one or more monomers at a temperature in the range of about 160° C. to about 230° C. to form a prepolymer; forming (e.g., by melt or solution processing) the prepolymer into the shape of the article, to yield a formed prepolymer shape; and further heating the formed prepolymer shape to yield the article.

Another aspect of the invention is an optical element including the polymeric composition as described herein, formed as a substantially optically transparent body.

Another aspect of the invention is an electrochemical cell comprising an anode comprising lithium; a cathode comprising the polymeric composition as described herein; and a non-aqueous electrolyte interposed between the cathode and the anode.

The present invention relates particularly to copolymers of sulfur with one or more ethylenically unsaturated monomers, epoxide monomers, or thiirane monomers (or a combination thereof). Such copolymers can in certain aspects provide sulfur cathode materials having improved charge capacity and cycle stability for use in electrochemical cells. Moreover, in certain aspects, polymeric materials including the copolymers described herein can be made using relatively simple methods that are amenable to large-scale production. The polymeric materials can in certain aspects be formed into composites, for example, with carbon materials and/or inorganic nanoparticulate materials. Such composites can have higher conductivity than elemental sulfur, and can therefore be especially useful as cathode materials in electrochemical cells (i.e., in batteries). Unlike prior art materials, in certain aspects the materials described herein can provide conveniently synthesizable and bulk-processable materials that have excellent, repeatedly cyclable performance on the order of up to about 1000 mAh/g or even up to about 1400 mAh/g. The polymeric materials described herein can be made to have high refractive index at visible and infrared wavelengths, and can therefore be useful in forming optical elements such as lenses, prisms and waveguides.

The invention will be further described with reference to embodiments depicted in the appended figures. It will be appreciated that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

The present inventors have determined that high sulfur content, high refractive index polymers can be made by the polymerization of relatively high proportions of sulfur together with relatively low proportions of one or more ethylenically unsaturated monomers, epoxide monomers and/or thiirane monomers. The inventors have determined that sulfur can, for example, be heated to form both radical and anionic species, which can not only homopolymerize to form longer sulfur chains, but also copolymerize with ethylenically unsaturated monomers, epoxide monomers and/or thiirane monomers to form sulfur/organic copolymers. While not intending to be bound by theory, the inventors surmise that heating opens up sulfur rings (e.g., $S_8$) to form radical species and/or anionic species, which can undergo ring-opening polymerization with other sulfur rings, addition polymerization with other ring-opened sulfur species, and radical or anionic copolymerization with other monomer species.

Figure 1:
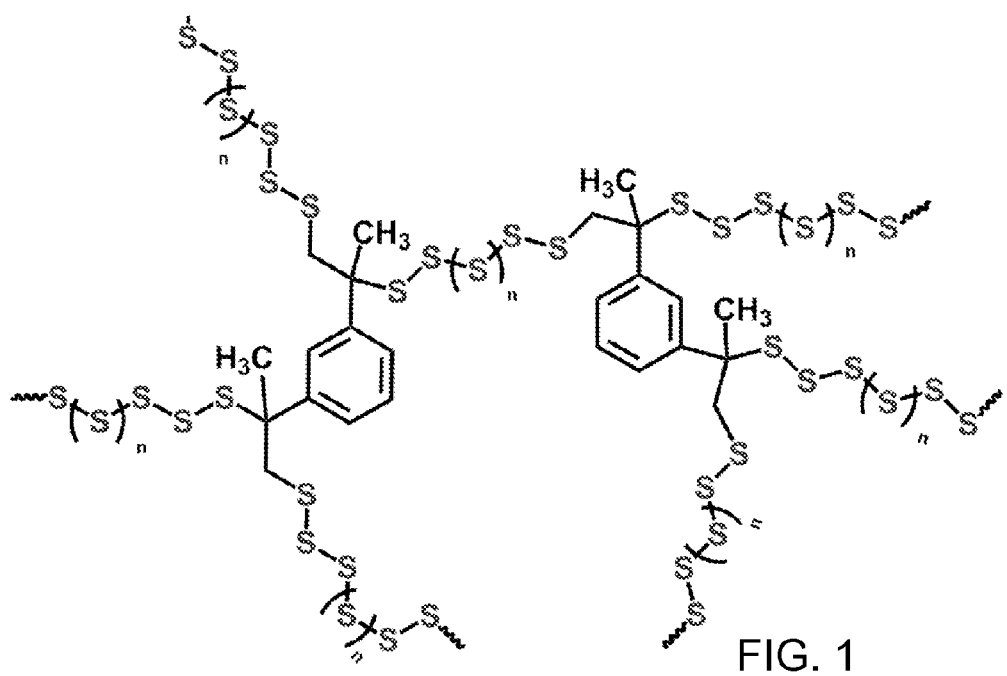
FIG. 1 is a schematic view of a copolymer according to one embodiment of the invention.

Thus, one aspect of the invention is a polymeric composition that includes a copolymer of sulfur, at a level in the range of at least about 50 wt % of the copolymer and one or more monomers each selected from the group consisting of ethylenically unsaturated monomers, epoxide monomers, and thiirane monomers, at a level in the range of about 0.1 wt % to about 50 wt % of the copolymer. As used herein, and as is common in the field of polymeric materials, compositions are specified (unless otherwise stated) in terms of the monomers for purposes of clarity and convenience; the person of skill in the art will appreciate that the monomers can exist in polymerized form in the actual copolymer. A schematic depiction of a copolymer according to one embodiment of the invention (here, a sulfur/1,3-diisopropenylbenzene copolymer) is provided in FIG. 1.

Figure 2:
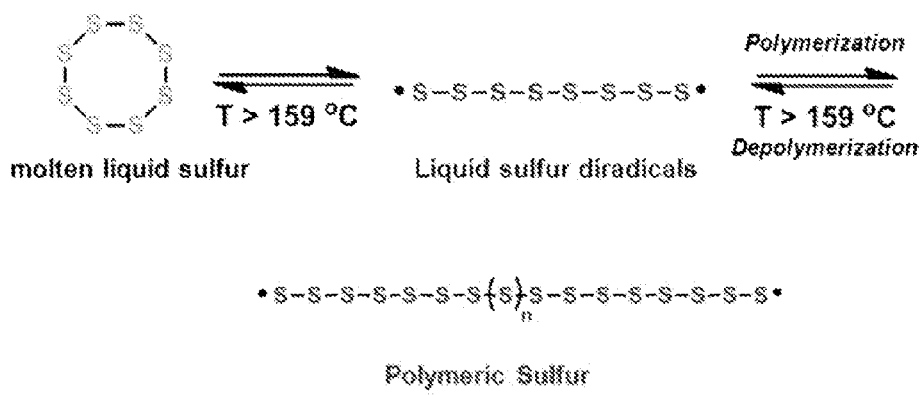
FIG. 2 is a schematic view of sulfur ring opening and polymerization.

The sulfur can be provided as elemental sulfur, for example, in powdered form. Under ambient conditions, elemental sulfur primary exists in an eight-membered ring form ($S_8$) which melts at temperatures in the range of 120-124° C. and undergoes an equilibrium ring-opening polymerization (ROP) of the $S_8$ monomer into a linear polysulfane with diradical chain ends, above 159° C., as shown in schematic view in FIG. 2. As the person of skill in the art will appreciate, while $S_8$ is generally the most stable, most accessible and cheapest feedstock, many other allotropes of sulfur can be used (such as other cyclic allotropes, derivable by melt-thermal processing of $S_8$). Any sulfur species that results in diradical or anionic polymerizing species when heated as described herein can be used in practicing the present invention.

Because both anionic and radical polymerization can occur in the polymerization reaction mixtures, any desirable combination of ethylenically unsaturated monomers, epoxide monomers and/or thiirane monomers can be used in the copolymers. For example, in certain embodiments, one or more monomers are one or more ethylenically unsaturated monomers. As used herein, an ethylenically unsaturated monomer is a monomer that is radically polymerizable through its ethylenic unsaturation (i.e., its double bond). However, the term "ethylenically unsaturated monomer" does not include cyclopentadienyl species such as cyclopentadiene and dicyclopentadiene. Similarly, the term "ethylenically unsaturated monomer" does not include compounds in which the ethylenic unsaturation is part of a long chain alkyl moiety (e.g. unsaturated fatty acids such as oleates, and unsaturated plant oils). In certain embodiments, the one or more ethylenically unsaturated monomers are selected from the group consisting of vinyl monomers, (meth)acryl monomers, unsaturated hydrocarbon monomers, and ethylenically-terminated oligomers. Examples of such monomers include, generally, mono- or polyvinylbenzenes, mono- or polyisopropenylbenzenes, mono- or polyvinyl(hetero)aromatic compounds, mono- or polyisopropenyl(hetero)aromatic compounds, alkylene di(meth)acrylates, bisphenol A di(meth)acrylates, benzyl (meth)acrylates, phenyl(meth)acrylates, heteroaryl (meth)acrylates, terpenes (e.g., squalene) and carotene. As molten sulfur is non-polar in character, in certain desirable embodiments the one or more ethylenically unsaturated monomers are non-polar. For example, in certain embodiments, the one or more ethylenically unsaturated monomers include a (hetero)aromatic moiety such as, for example, a phenyl, a pyridine, a triazine, a pyrene, a naphthalene, or a polycyclic (hetero)aromatic ring system, bearing one or more vinylic, acrylic or methacrylic substituents. Examples of such monomers include benzyl (meth)acrylates, phenyl (meth)acrylates, divinylbenzenes (e.g., 1,3-divinylbenzene, 1,4-divinylbenzene), isopropenylbenzene, styrenics (e.g., styrene, 4-methylstyrene, 4-chlorostyrene, 2,6-dichlorostyrene, 4-vinylbenzyl chloride), diisopropenylbenzenes (e.g., 1,3-diisopropenylbenzene), vinylpyridines (e.g., 2-vinylpyridine, 4-vinylpyridine), 2,4,6-tris((4-vinylbenzyl)thio)-1,3,5-triazine and divinylpyridines (e.g., 2,5-divinylpyridine). In certain embodiments, the one or more ethylenically unsaturated monomers (e.g., including an aromatic moiety) bears an amino (i.e., primary or secondary) group, a phosphine group or a thiol group. One example of such a monomer is vinyldiphenylphosphine. While not intending to be bound by theory, the inventors surmise that the amino or thiol group will undergo a ring-opening nucleophilic attack on an $S_8$ ring, thus incorporating a short sulfide chain that promotes solubility in molten sulfur. Of course, the person of skill in the art will identify other ethylenically unsaturated monomers that can be used in forming the copolymers described herein. In certain desirable embodiments, an ethylenically unsaturated monomer will have a boiling point greater than 180° C., greater than 200° C., or even greater than 230° C. at the pressure at which polymerization is performed (e.g., at standard pressure).

In other embodiments, the one or more monomers are one or more epoxide monomers. Examples of such monomers include, generally, mono- or polyoxiranylbenzenes, mono- or polyglycidylbenzenes, mono- or polyglycidyloxybenzenes, mono- or polyoxiranyl(hetero)aromatic compounds, mono- or polyglycidyl(hetero)aromatic compounds, mono- or polyglycidyloxy(hetero)aromatic compounds, diglycidyl bisphenol A ethers, mono- or polyglycidyl(cyclo)alkyl ethers, mono- or polyepoxy(cyclo)alkane compounds and oxirane-terminated oligomers. As described above with respect to ethylenically unsaturated monomers, in certain embodiments, the one or more epoxide monomers include a (hetero)aromatic moiety such as, for example, a phenyl, a pyridine, a triazine, a pyrene, a naphthalene, or a polycyclic (hetero)aromatic ring system, bearing one or more epoxide groups. For example, in certain embodiments, the one or more epoxide monomers are selected from epoxy(hetero) aromatic compounds, such as styrene oxide and stilbene oxide and (hetero)aromatic glycidyl compounds, such as glycidyl phenyl ethers (e.g., resorcinol diglycidyl ether, glycidyl 2-methylphenyl ether), glycidylbenzenes (e.g., (2,3-epoxypropyl)benzene) and glycidyl heteroaromatic compounds (e.g., N-(2,3-epoxypropyl)phthalimide). In certain desirable embodiments, an epoxide monomer will have a boiling point greater than 180° C., greater than 200° C., or even greater than 230° C. at the pressure at which polymerization is performed (e.g., at standard pressure, or at other pressures).

In other embodiments, the one or more monomers are one or more thiirane monomers. For example, in one embodiment, the one or more monomers are a combination of one or more thiirane monomers and one or more epoxide monomers. Examples of thiirane monomers include, generally, mono- or polythiiranylbenzenes, mono- or polythiiranylmethylbenzenes, mono- or polythiiranyl(hetero)aromatic compounds, mono- or polythiiranylmethyl(hetero)aromatic compounds, dithiiranylmethyl bisphenol A ethers, mono- or polydithiiranyl (cyclo)alkyl ethers, mono- or polyepisulfide(cyclo)alkane compounds, and thiirane-terminated oligomers. As described above with respect to ethylenically unsaturated monomers, in certain embodiments, the one or more thiirane monomers include a (hetero)aromatic moiety such as, for example, a phenyl, a pyridine, a triazine, a pyrene, a naphthalene, or a polycyclic (hetero)aromatic ring system, bearing one or more thiirane groups. In certain desirable embodiments, a thiirane monomer will have a boiling point greater than 180° C., greater than 200° C., or even greater than 230° C. at the pressure at which polymerization is performed (e.g., at standard pressure).

Because both radical and anionic species can be generated during the same polymerization, it is possible to incorporate both ethylenically unsaturated monomers and epoxide monomers and/or thiirane monomers into the same copolymer. Thus, in one embodiment of the invention, the one or more monomers are a combination of one or more ethylenically unsaturated monomers and one or more epoxide monomers. In other embodiments of the invention, the one or more monomers are a combination of one or more ethylenically unsaturated monomers and one or more thiirane monomers. In still other embodiments of the invention, the one or more monomers are a combination of one or more ethylenically unsaturated monomers, one or more epoxy monomers and one or more thiirane monomers.

The person of skill in the art will select monomers and relative ratios thereof in order to provide the desired properties to the polymer. In certain embodiments, the one or more monomers include one or more polyfunctional monomers, optionally in combination with one or more monofunctional monomers. A polyfunctional monomer is one that includes more than one (e.g., 2, or 3) polymerizable ethylenically unsaturated, epoxy or thiirane moieties. Polyfunctional monomers can be used to cross-link sulfur chains to adjust the properties of the polymer, as would be understood by the person of skill in the art. The multiple polymerizable groups of a polyfunctional monomer can be the same or different. For example, a polyfunctional monomer can be a poly(ethylenically unsaturated) monomer, such as a polyvinyl monomer, polyisopropenyl monomer, a polyacryl monomer, a polymethacryl monomer or a polyunsaturated hydrocarbon monomer. In other embodiments, a polyfunctional monomer can be a polyepoxide monomer, or a polythiirane monomer. Frechet-type benzyl ether dendrimers bearing styrenic terminal groups are miscible with liquid sulfur and can be used as polyfunctional cross-linkers. In certain embodiments, the one or more polyfunctional monomers includes one or more of a divinylbenzene, a diisopropenylbenzene, an alkylene di(meth)acrylate, a bisphenol A di(meth)acrylate, a terpene, a carotene, a divinyl (hetero)aromatic compound and a diisopropenyl (hetero)aromatic compound. In other embodiments, a polyfunctional monomer can have one or more ethylenically unsaturated moieties, and one or more epoxide moieties (e.g., a divinylbenzene monoxide).

In certain embodiments, the copolymer includes the sulfur at a level in the range of about 50 to about 99.9 wt % of the copolymer, and the one or more monomers at a level in the range of about 0.1 wt % to about 50 wt % of the copolymer. For example, in some embodiments, the copolymer includes the sulfur at a level in the range of about 50 to about 99 wt % of the copolymer, and the one or more monomers at a level in the range of about 1 wt % to about 50 wt % of the copolymer. In other embodiments, the copolymer includes the sulfur at a level in the range of about 50 to about 97.5 wt % of the copolymer, and the one or more monomers at a level in the range of about 2.5 wt % to about 50 wt % of the copolymer. In other embodiments, the copolymer includes the sulfur at a level in the range of about 50 to about 95 wt % of the copolymer, and the one or more monomers at a level in the range of about 5 wt % to about 50 wt % of the copolymer. For certain comonomers, higher feed ratios of the comonomer(s) (e.g., at least about 20%, or even at least about 30%) can afford sulfur copolymers that are soluble in nonpolar organic solvents (e.g., THF, toluene, $CS_2$, DMF). For example, in the case of a random copolymer of $S_8$ and 1,3-diisopropenylbenzene (poly (sulfur-random-(1,3-diisopropenylbenzene) (poly(S-r-DIB)), copolymers with 50 wt % of DIB were fully soluble in the above mentioned nonpolar organic solvents and thus amenable to solution processing and emulsification.

The person of skill in the art will adjust the relative amounts of sulfur and monomer to provide the desired properties to the material. For example, in some embodiments, such as when the material is to be used as a cathode material in an electrochemical cell, it may be desirable to use relatively more sulfur in order to provide higher energy density. In other embodiments, such as when the material is to be used in an optical element, it may be desirable to use relatively less sulfur in order to provide better processability and optical clarity.

Thus, in certain embodiments as described above, the copolymer includes the sulfur at a level of at least about 60 wt % of the copolymer, and the one or more monomers at a level in the range of no more than about 40 wt % of the copolymer. In other embodiments as described above, the copolymer includes the sulfur at a level of at least about 70 wt % of the copolymer. And in certain embodiments as described above, the copolymer includes the sulfur at a level of no more than about 92 wt % of the copolymer. In other embodiments as described above, the copolymer includes the sulfur at a level of no more than about 90 wt % of the copolymer. For example, in certain embodiments, the copolymer comprises the sulfur at a level in the range of about 70 to about 92 wt % of the copolymer. In certain such embodiments, the copolymer includes the one or more monomers at a level in the range of about 8 wt % to about 30 wt % of the copolymer.

In one embodiment of the invention as described above, the sulfur and the one or more monomers are present at a total level of at least about 70 wt % of the copolymer (i.e., exclusive of any additional, nonpolymerized materials in the polymeric composition). For example, in certain embodiments, the sulfur and the one or more monomers are present at a total level of at least about 85 wt %, at least about 95%, at least about 98%, or even at least about 99% of the copolymer. For example, in one embodiment, the copolymer comprises sulfur at a level of about 50 to about 98 wt % of the copolymer, one or more polyfunctional monomers at a level of about 2 to about 50 wt % of the copolymer and optionally one or more monofunctional monomers at a level up to about 10 wt % of the copolymer, wherein the sulfur, the one or more polyfunctional monomers and the optional one or more monofunctional monomers are present at a level of at least about 70 wt % of the copolymer (or, as described above, at least about 85 wt %, at least about 95%, at least about 98%, or even at least about 99% of the copolymer).

For example, in one embodiment, the copolymer includes sulfur, at a level in the range of about 70 to about 92 wt % of the copolymer; one or more polyfunctional monomers selected from the group consisting of a divinylbenzene, a diisopropenylbenzene and an alkylene di(meth)acrylate, at a level in the range of about 8 to about 30 wt % of the copolymer; optionally one or more monofunctional monomers (such as benzyl methacrylate), at a level up to about 1.5 wt % of the sulfur; and optionally triphenylphosphine, at a level up to about 20 wt % of the sulfur.

The polymeric materials can be made, for example, by polymerization of molten sulfur with the monomers. Thus, in one aspect, the invention provides a method for making a polymeric composition as described above. The method includes heating a mixture including sulfur and the one or more monomers together at a temperature sufficient to initiate polymerization (i.e., through free radical polymerization, through anionic polymerization, or through both, depending on the monomers used). For example, in one embodiment, the method includes heating a mixture including sulfur and the one or more monomers together at a temperature in the range of about 120° C. to about 230° C., e.g., in the range of about 160° C. to about 230° C. The person of skill in the art will select conditions that provide the desired level of polymerization, using, in part, information provided in the Examples, below. In one embodiment, the mixture comprising sulfur and one or more monomers is formed by first heating a mixture comprising sulfur to form a molten sulfur, then adding one or more monomers to the molten sulfur. In certain embodiments, the polymerization reaction is performed under ambient pressure. However, in other embodiments, the polymerization reaction can be performed at elevated pressure (e.g., in a bomb or an autoclave). Elevated pressures can be used to polymerize more volatile monomers, so that they do not vaporize under the elevated temperature reaction conditions.

In certain embodiments, it can be desirable to use a nucleophilic viscosity modifier in liquefying the sulfur, for example, before adding one or more of the monomers (e.g., before adding any polyfunctional monomer). For example, in certain embodiments, the sulfur is first heated with a viscosity modifier, then the viscosity-modified sulfur is heated with one or more monomers (e.g., with one or more polyfunctional monomers). The nucleophilic viscosity modifier can be, for example, a phosphorus nucleophile (e.g., a phosphine), a sulfur nucleophile (e.g., a thiol) or an amine nucleophile (e.g., a primary or secondary amine). When sulfur is heated in the absence of a nucleophilic viscosity modifier, the sulfur rings can open to form, e.g., diradicals, which can combine to form linear polysulfide chains which can provide a relatively high overall viscosity to the molten material. Nucleophilic viscosity modifiers can break these linear chains into shorter lengths, thereby making shorter polysulfides that lower the overall viscosity of the molten material, making it easier to mix with monomers and other species and easier to stir for efficient processing. Some of the nucleophilic viscosity modifier will react to be retained as a covalently bound part of the copolymer, and some will react to form separate molecular species, with the relative amounts depending on nucleophile identity and reaction conditions. For example, triphenylphosphine can react with $S_8$ to form triphenylphosphonium-terminated linear sulfides (which can go on to form copolymer) together with triphenylphosphine sulfide (unbound). While some of the nucleophilic viscosity modifier may end up as a separate molecular species from the polymer chain, as used herein, nucleophilic viscosity modifiers are considered to be part of the copolymer. Examples of nucleophilic viscosity modifiers include triphenylphosphine, aniline, benzenethiol, N,N-dimethylaminopyridine. Nucleophilic viscosity modifiers can be used, for example, in an amount up to about 10 wt %, or even up to about 5 wt % of the copolymer. When a nucleophilic viscosity modifier is used, in certain embodiments it can be used in the range of about 5 wt % to about 15 wt % of the sulfur.

In certain embodiments, a monofunctional monomer can be used to reduce the viscosity of the sulfur, for example, before adding other of the monomers (e.g., before adding any polyfunctional monomer). For example, in certain embodiments, the sulfur is first heated with one or more monofunctional monomers, then the resulting mixture is heated with one or more other monomers (e.g., with one or more polyfunctional monomers). While not intending to be bound by theory, the inventors surmise that inclusion of monofunctional monomers into the polysulfide chains disrupts intermolecular associations of polysulfides and thus decreases the viscosity. The monofunctional monomer can be, for example, a mono(meth)acrylate such as benzyl methacrylate, a mono (oxirane) such as a styrene oxide or a glycidyl phenyl ether or a mono(thiirane) such as t-butyl thiirane or phenoxymethylthiirane. A monofunctional monomer can be used to modify the viscosity of the sulfur, for example, in an amount up to about 10 wt %, up to about 5 wt %, or even up to about 2 wt % of the copolymer. When a monofunctional monomer can be used to modify the viscosity of the sulfur, in certain embodiments it can be used in the range of about 0.5 wt % to about 5 wt %, or even about 0.5 wt % to about 3 wt % of the sulfur.

Of course, viscosity modification is not required, and so in other embodiments, the sulfur is heated together with the one or more monomers (and particularly with one or more polyfunctional monomers) without viscosity modification. In other embodiments, a solvent, e.g., a halobenzene such as 1,2,4-trichlorobenzene, a benzyl ether or a phenyl ether, can be used to modify the viscosity of the materials for ease of handling. The solvent can be added, for example, to the sulfur before reaction with a monomer in order to reduce its viscosity, or to the polymerized material in order to aid in processing into a desired form factor.

The inventors have determined that copolymers of sulfur and thiirane monomers can be made in solution using thioacyl group transfer polymerization, as exemplified by the reaction scheme below:

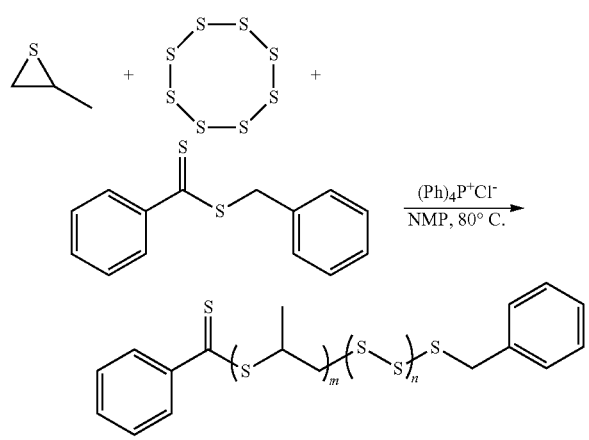

Thus, another aspect of the invention is a polymeric composition comprising a copolymer of sulfur, at a level in the range of at least 10 wt % of the copolymer, and one or more thiirane monomers, at a level in the range of about 0.1 wt % to about 90 wt % of the copolymer, wherein the copolymer can be terminated, for example, with a thioester or a trithiocarbonyl, e.g., the thioester or trithiocarbonyl of a reversible addition-fragmentation chain transfer (RAFT) agent. Of course, other terminating groups can be used, and as the person of skill in the art will appreciate, even when using RAFT polymerization, some fraction of the polymer chains will be terminated otherwise as a result of competing termination processes. In certain embodiments, the sulfur is present in an amount greater than about 50 wt %. In certain embodiments, the sulfur is present in an amount no more than about 90 wt %, or even no more than about 80 wt %. In one embodiment, a copolymer comprises sulfur in the range of about 10 to about 90 wt % (e.g., about 10 to about 80 wt %, or about 50 to about 90 wt %, or about 50 wt % to about 80 wt %). In one such embodiment, the copolymer comprises one or more thiirane monomers in the range of about 5 to about 90 wt % (e.g., about 15 to about 90 wt %, about 5 to about 50 wt %, or about 15 to about 50 wt %). In certain such embodiments, the sulfur and the one or more monomers make up at least about 90 wt %, or even at least about 95 wt % of the copolymer.

The one or more thiirane monomers can include polyfunctional and/or monofunctional monomers as described elsewhere herein. Examples of monomers include propylene sulfide, t-butyl thiirane, phenoxymethyl thiirane, vinylthiirane, and 2-((allyloxy)methyl)thiirane. For example, in one embodiment, the copolymer is a copolymer of sulfur and an alkylene sulfide such as propylene sulfide. Other characteristics of these copolymers can be as defined for other materials described herein. Such materials can be made into polymeric compositions, composites and devices as otherwise described herein. Advantageously, sulfur/thiirane copolymers of up to about 80 wt % sulfur can be soluble in a variety of solvents, such as NMP, toluene, $CS_2$ and tetrahydrofuran.

Another aspect of the invention is a method for making a sulfur/thiirane copolymer as described above. The method includes reacting the thiirane monomer(s) and the sulfur (i.e., in the amounts appropriate to provide the desired copolymer composition as described above) with a thioester (—C(S)—S—) or trithiocarbonyl (—S—C(S)—S—) based RAFT polymerization agent in a solvent. Suitable RAFT polymerization agents include, for example, benzyl dithiobenzoate. The polymerization can be performed, for example, at a temperature in the range of about 20° C. to about 120° C., for example, from about 20° C. to about 90° C. The solvent can be selected by the person of skill in the art in view of the particular materials used; examples include N-methylpyrrolidinone and toluene. A catalyst, such as tetraphenylphosphonium chloride can optionally be used. The person of skill in the art can adapt known RAFT polymerization techniques for use in making the copolymers described herein. For example, chain transfer agents based on dithioesters, trithiocarbonyls, dithiocarbamates and xanthates can generally be adapted by the person of skill in the art for use in making the copolymers described herein, as can-onium salts (e.g., those based on phosphonium halides, imidazolium halides and ammonium halides).

The polymeric composition can in some embodiments consist essentially of the copolymer. In other embodiments, the polymeric composition can include another material in admixture with the copolymer, for example, in particulate or divided form. Thus, another aspect of the invention is a polymer composition in the form of a polymeric composite including a copolymer as described herein, with a solid dispersed therein. The solid can be dispersed at a level of, for example, up to about 50 wt % of the composition. In other embodiments, the solid is dispersed at a level up to about 30 wt %, up to about 10 wt %, or even up to about 5 wt % of the composition. When a solid is dispersed in the copolymer to form a polymeric composite, in certain desirable embodiments the solid is present in an amount of at least about 0.5%, or even at least about 1 wt % of the composition. In other embodiments (e.g., when the solid is present in an amount of up to about 50 wt % or up to about 30 wt % of the composition), the solid is present in an amount of at least about 10% of the composition.

For example, in one embodiment of the polymeric composite as described above, the polymeric composite includes the copolymer and an elemental carbon material dispersed in the copolymer at a level in the range of, for example, up to about 50 wt %, up to about 30 wt %, or up to about 10 wt % of the composition. As used herein, an "elemental carbon material" is a material that is primarily formed as an allotrope of carbon, with a minor amount of chemical modification. For example, graphene, graphene oxide, graphite, carbon nanotubes, fullerenes, carbon black, carbon flakes and carbon fibers are examples of elemental carbon materials. Such materials can be made, for example, by first dispersing the elemental carbon material in molten sulfur, then copolymerizing the molten sulfur with one or more monomers (e.g., one or more polyfunctional monomers). As a general guideline for the person of skill in the art to use in formulating such materials, up to about 15 wt % elemental carbon material can be dispersed in sulfur at temperatures high enough that the sulfur is molten, but low enough that significant ring opening and polysulfide polymerization does not occur (e.g., at temperatures in the range of about 120° C. to about 160° C.).

Higher loadings of elemental carbon materials in sulfur can be achieved by pre-dissolution of the sulfur and dispersion of the elemental carbon material into a suitable solvent (e.g., carbon disulfide) followed by removal of the solvent under reduced pressure to yield a blended composite powder which can be melted and reacted with the one or more monomers. To induce curing of the dispersed carbon, or other nanoinclusions with the sulfur matrix, direct heating of the dispersion above T=160° C., typically below 200° C. affords a polymerized nanocomposite.

In certain embodiments, a dispersant can be used to aid in the dispersion of the elemental carbon material in the sulfur. For example, the dispersant can be a polycyclic aromatic hydrocarbon such as pyrene, or, in other embodiments, phenanthrene, triphenylene, anthracene, chrysene or tetracene. The polycyclic aromatic hydrocarbon (e.g., pyrene) can be provided, for example, at a level in the range of about 10 to about 45 wt % of the sulfur (e.g., together with the elemental carbon material at a level of up to about 40 wt % of the sulfur. Of course, use of a dispersant is not necessary in all embodiments, and in some embodiments, e.g., when the elemental carbon material is carbon fibers, no dispersant is used.

In another embodiment of the polymeric composite as described above, the polymeric composite includes the copolymer and inorganic nanoparticles dispersed in the copolymer at a level in the range of, for example, up to about 50 wt %, up to about 30 wt %, or up to about 10 wt % of the composition. The inorganic nanoparticles can, for example, be metallic nanoparticles, such as, for example, gold nanoparticles, silver nanoparticles, copper nanoparticles, cobalt nanoparticles or molybdenum nanoparticles. In certain embodiments, an organometallic complex that is nonpolar can dissolve in the molten sulfur and react with heating (e.g., at 200° C.) to form reduced metal particles, followed by reaction with one or more monomers as described elsewhere herein. In one embodiment, the organometallic complex includes one or more triphenylphosphinyl ligands or one or more carbonyl ligands (e.g., $ClAu(I)PPh_3$, $ClAu(I)CO$, $Co_2(CO)_8$ and $Mo(CO)_x$). This work is described in detail in W. J. Chung, "Elemental Sulfur as a Reactive Medium for Gold Nanoparticles and Nanocomposite Materials," *Agnew. Chem. Int. Ed.* 2011, 50, 11409-12, which is hereby incorporated by reference in its entirety. To induce curing of the dispersed nanocomposites, or other nanoinclusions with the sulfur matrix, direct heating of the dispersion above T=160° C., typically below 200° C. affords a polymerized nanocomposite.

The polymers described herein can be partially cured to provide a more easily processable material, which can be processed into a desired form (e.g., into a desired shape, such as in the form of a free-standing shape or a device), then fully cured in a later operation. For example, one embodiment of the invention is a method of making an article formed from a polymeric composition as described herein. The method includes heating a mixture comprising sulfur and one or more monomers at a temperature in the range of about 160° C. to about 230° C. to form a prepolymer; forming the prepolymer into the shape of the article, to yield a formed prepolymer shape; and further heating the formed prepolymer shape to yield the article. The prepolymer can be formed, for example, by conversion of the one or more monomers at a level in the range of about 20 to about 50 mol %. For example, the heating of the sulfur and the one or more monomers to form the prepolymer can be performed for a time in the range of about 20 seconds to about five minutes, for example, at a temperature in the range of about 175° C. to about 195° C. In one embodiment, the heating is performed for less than about 2 minutes at about 185° C. The person of skill in the art will determine the desired level of monomer conversion in the prepolymer stage to yield a processable prepolymer material, and will determine process conditions that can result in the desired level of monomer conversion.

In one embodiment, the prepolymer can be provided as a mixture with a solvent for forming. The prepolymers described herein can form miscible mixtures or solutions with a variety of nonpolar high-boiling aromatic solvents, including, for example, haloarene solvents such as di- and trichlorobenzene (e.g., 1,2,4-trichlorobenzene). The solvent can be added, for example, after the prepolymer is formed, to provide a softened or flowable material suitable for a desired forming step (e.g., casting, molding, or spin-, dip- or spray-coating.) In some embodiments, the prepolymer/solvent mixture can be used at elevated temperatures (e.g., above about 100° C., above about 120° C. or above about 140° C.) to improve flow at relatively low solvent levels (e.g., for use in casting or molding processes). In other embodiments, the prepolymer/solvent mixture can be used at a lower temperature, for example, at ambient temperatures (e.g., for use in spin-coating processes); unlike molten sulfur, the prepolymers described herein can remain soluble even after the solvent cools.

In one embodiment, the prepolymer is coated and cured as a film on a substrate. While $S_8$ is typically intractable due to its crystallinity, the materials described herein can be formed as to be amenable to solution processing (e.g., in molten or solvent-admixed form) to fabricate thin film materials. Mixtures of molten prepolymer and solvent can be diluted to the concentration desired for a given spin-coating process.

When forming thin films of the materials described herein on substrates, it can often be desirable to use a polyimide primer layer. Thus, a solution of a polyamic precursor (e.g., polypyromellitamic acid-4,4'-dianiline, or compounds with oxyaniline linkages), or similar copolymer derivatives can be deposited onto a substrate and cured (e.g., by heating at a temperature in the range of about 120 to about 200° C.) to form a thin polyimide layer (e.g., as thin as 2 nm), upon which the materials described herein can be formed. Moreover, in many embodiments, even fully cured polymers as described herein can be melt processed or admixed with or dissolved in solvent and deposited on to substrates in a manner similar to those described for prepolymeric materials.

In certain embodiments, the prepolymer can be shaped and cured using a mold. For example, in one embodiment, the prepolymer (i.e., in molten or solvent-admixed form) can be disposed (e.g., by pouring) into a TEFLON or silicone (e.g., polydimethylsiloxane (PDMS)) mold, then cured to form a desired shape. In another embodiment, a softened prepolymer material (e.g., swollen with solvent and/or softened by heat) can be imprinted by stamping with a mold bearing the desired inverse surface relief, then cured and allowed to cool. Moreover, in many embodiments, even fully cured polymers as described herein can be shaped with a mold in a manner similar to those described for prepolymeric materials.

As described above, soluble copolymers can be made by the person of skill in the art, for example, using relatively higher fractions of organic comonomer(s). Such polymers can be solution processed to fabricate articles. For example, another aspect of the invention is a method of forming an article formed from a polymeric composition as described herein, the method comprising admixing the polymeric composition in a nonpolar organic solvent, forming the admixed polymeric composition into the shape of the article; and removing the solvent from the polymeric composition to yield the article. The admixture with solvent can, for example, dissolve the copolymer. Various process steps can be performed at elevated temperatures, for example, to decrease viscosity of the admixed polymeric composition and to aid in evaporation of solvent.

For example, in one embodiment, a room temperature solution (e.g., in a dichlorobenzene or a trichlorobenzene) of a random copolymer (e.g., in prepolymeric form) prepared via the thermal free radical copolymerization of $S_8$ and 1,3-diisopropenylbenzene (poly(S-r-DIB)) (72.5 wt % sulfur, 27.5 wt % DIB) is poured into a TEFLON or PDMS mold. A decrease in viscosity at elevated temperatures (e.g., >about 140° C.) can allow sufficient flow into even intricate mold shapes. Once the mold is filled, it can be placed in a vacuum oven at increased temperature (e.g., about 210° C.) under ambient pressure to cure and to drive off solvent. For thicker molded samples, vacuum can be pulled on the solution when it is in a low viscosity state in order to ensure the removal of bubbles. The mold is then removed from the oven and allowed to cool before removal from the mold.

As the polymeric materials described herein can be effectively thermoplastic in nature, the person of skill in the art will understand that other methods familiar in the thermoplastic industries, such as injection molding, compression molding and melt casting, can be used in forming devices from the materials described herein.

Another embodiment is an oil-in-water emulsion comprising a polymeric composition as described herein as the colloidal phase, suspended in aqueous solution with a surfactant. The surfactant can be, for example, a polyether, such as TRITON X-100; an alkylsulfate, such as sodium lauryl sulfate; an aromatic sulfonate, such as dodecylbenzene sulfonic acid, sodium salt); or an alkyltetrammonium salt, such as cetyl trimethylammonium bromide. For example, in one embodiment, an emulsion can be made by diluting a polymeric material having a desired level of polymerization (e.g., a prepolymer, or a more fully cured polymer) in a suitable solvent (e.g., a haloarene solvent), then directly emulsifying the solution into an aqueous solution of the surfactant. In another embodiment, a polymeric material as described herein (e.g., 50 wt % S, 50 wt % DIB copolymerized at 180° C.) can be dissolved into $CS_2$, and emulsified in surfactant-containing water as described above, then the $CS_2$ can be removed under reduced pressure to form sulfur copolymer colloids with a tunable range of particle size from 10 nm to 100 micrometers. These polymeric colloids and emulsions can be useful for a number of applications, such as for use in fertilizers, and in the fabrication of high surface area, nanoscopic cathodes for Li—S batteries, which due to high surface area can be cycled at higher discharge-charge rates.

Given the high sulfur content, the polymeric materials as described herein can be made with high refractive indices. For example, in certain embodiments, the polymeric compositions of the present invention have refractive indices in the range of about 1.7 to about 2.2 at wavelengths spanning the UV into the visible and infrared regime of the electromagnetic spectrum. For example, in certain embodiments, the polymeric compositions of the present invention can have refractive indices in the range of about 1.7 to about 2.2 at at least one wavelength in the range of from about 300 nm to about 1500 nm. For example, in certain embodiments, the polymeric compositions of the present invention can have refractive indices in the range of about 1.7 to about 2.2 throughout the wavelength range of from about 700 nm to about 1500 nm. The person of skill in the art can tune the refractive indices, for example, by the selection of the particular monomers used as well as the relative ratios of sulfur and monomers. For example, in the visible wavelength range, a person of skill in the art could adjust the refractive index of the sulfur copolymer by using comonomers containing heavy heteroatom substituents (e.g., Ag, Br, I). While refractive indices in the range of about 1.7 to about 2.0, or even about 1.7 to about 2.1 can be achieved using only copolymers of sulfur and the one or more monomers, in certain embodiments the person of skill in the art can disperse higher index nanoparticles in the copolymers to provide higher index polymer composites. In certain embodiments, the materials have relatively low loss in the infrared, for example, less than 30%, or even less than 15% transmission loss for a 5 mm thick sample. In certain embodiments, the high index materials can be substantially optically clear, such that they can be used in the fabrication of optical elements such as lenses, prisms, gratings and waveguides. In certain embodiments, materials as described herein used in optical elements has a sulfur content of less than about 80%, less than about 75%, or even about less than 70%.

High refractive index materials can find use in a variety of optical technologies. Accordingly, another embodiment of the invention is an optical element including a polymeric composition as described herein, formed as a substantially optically transparent body. For example, the body can be formed to be substantially optically clear, and provide at least about 50% transmittance, at least about 70% transmittance, or even at least about 80% transmittance for light of wavelength 1500 nm. The body can be formed, for example, as one or more lenses. For example, in one embodiment, the body is formed as an array of lenses, for example, through a molding process. In other embodiments, the body is a prism, a waveguide, or a grating, which in many embodiments can also be formed through polymer molding processes. The refractive index of the material of the body can be, for example, in the range of about 1.7 to about 2.2, in the range of about 1.7 to about 2.1, or in the range of about 1.7 to about 2.0.

The lithium-sulfur redox couple is gaining increased attention for use in battery materials. The relevant chemical equation is provided below:

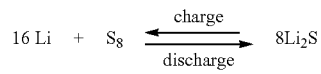

The potential difference is 2.5 V. vs. Li/Li$^+$. There are several intermediate lithium sulfide species that are possible in the overall reaction; $Li_2S_8$ and $Li_2S_6$ dissolve into the electrolyte, but $Li_2S_4$, $Li_2S_2$ and $Li_2S$ can form intractable "chalks," which can clog pores of the device and result in a loss of electrical contact. Lithium/sulfur batteries are attractive electrochemical energy storage systems which exhibit high capacity, high energy density, are lightweight, and can be formed from inexpensive, relatively common materials. Heavy metals from metal oxide active materials, are not used, making them environmentally friendly. However, as noted above, they suffer from a number disadvantages, most notably low conductivity and the inability to retain high charge capacity for extended cycle lifetimes. For example, current lithium/sulfur batteries have lifetimes only on the order of tens of cycles, as compared with 500 to 1000 cycles for lithium ion batteries.

The present inventors have determined that the presently described polymeric compositions can be used as the sulfur phase in a lithium/sulfur electrochemical cell to provide not only high charge capacity but also extended cycle lifetimes.

The polymeric materials as described herein can be made to have increased lithium ion permeability, and can suppress $Li_xS_y$ dissolution as well as "chalking" of $Li_2S$.

Accordingly, another aspect of the invention is an electrochemical cell including an anode comprising lithium, a cathode comprising a polymeric composition as described herein, and a non-aqueous electrolyte interposed between the cathode and the anode. A schematic depiction of such an electrochemical cell is provided in FIG. 3. In the electrochemical cell 30 of FIG. 3, cathode 32 and anode 34 are separated by and in contact with non-aqueous electrolyte 36. The person of skill in the art will understand that a variety of electrochemical cell architectures can be used in the practice of the present invention. Electrochemical cells using the polymers herein can be made having high charge capacities, for example, in the range of about 200 to about 1400 mAh/g, or in the range of about 600 to about 1000 mAh/g.

As is familiar to the person of skill in the art, the electrolytes used in electrochemical cells function as a medium for the storage and transport of ions. The electrolytes used in the electrochemical cells of the present invention are non-aqueous, and can include, for example, one or more non-aqueous liquid electrolyte solvents, gel polymer materials or solid polymer materials. For example, in certain embodiments, the liquid electrolyte solvent is selected from N-methyl acetamide, acetonitrile, acetals, ketals, esters, carbonates, sulfones, sulfolanes, aliphatic ethers, cyclic ethers, glymes, polyethers, phosphate esters, siloxanes, dioxolanes, N-alkylpyrrolidinones, and mixtures thereof. For example, in one embodiment, the liquid electrolyte solvent is dimethoxymethane, trimethoxymethane, ethylene glycol dimethyl ether, tetrahydrofuran, 1,3-dioxolane, 1,4-dioxolane, or a glyme.

In other embodiments, the electrolyte includes a gel polymer electrolyte, which can be plasticized by a liquid electrolyte as described above. For example, in certain embodiments, a gel polymer electrolyte material includes a polymer selected from polyethylene oxides, polypropylene oxides, polyacrylonitriles, polysiloxanes, polyimides, polyphosphazenes, polyethers, sulfonated polyimides, perfluorinated membranes (e.g., NAFION resins), polydivinyl polyethylene glycols, polyethylene glycol diacrylates, polyethylene glycol dimethacrylates, and derivatives thereof, and copolymers and blends thereof.

In other embodiments, the electrolyte includes a solid polymer electrolyte material, for example, including a polymer selected from polyethers, polyethylene oxides, polypropylene oxides, polyimides, polyphosphazenes, polyacrylonitriles, polysiloxanes, and derivatives thereof, and copolymers and blends thereof. The solid polymer electrolyte may contain a liquid electrolyte solvent as described above, for example, at a level of less than about 20% by volume of the total electrolyte.

Ionic electrolyte salts can be added to the electrolyte to increase its ionic conductivity. Desirably, the ionic electrolyte salt is a lithium salt. Examples of lithium salts for use in the electrolytes of the electrochemical cells of certain embodiments of the present invention include LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$ and Li-salt complexes with oligo(ethylene oxides).

As noted above, the cathode of the electrochemical cell includes a polymeric composition as described herein. The cathode is desirably at least about 30 wt %, at least about 40 wt %, or even at least about 60 wt % of a sulfur copolymer as described above, with desirable upper levels of copolymer for each of about 90 wt % or about 80 wt % serving as the active material. As the person of skill in the art will appreciate, the cathode can also include other materials as is conventional in the art. For example, in one embodiment, the cathode further includes an electroactive metal chalcogenide and/or an electroactive conductive polymer.

In other embodiments, the cathode may include one or more conductive fillers to provide enhanced electrical conductivity. Examples of conductive fillers include, for example, conductive carbons, graphites, activated carbon fibers, non-activated carbon nanofibers, metal flakes, metal powders, metal fibers, carbon fabrics, metal mesh and electrically conductive polymers. The amount of conductive filler, if present, can be, for example, in the range of about 2 wt % to about 50 wt % of the cathode, or in the range of about 4 wt % to about 35 wt % of the cathode. The conductive filler can be provided as part of a polymer nanocomposite as described above, or alternatively can be provided in physical admixture with the polymer materials described herein.

The cathode may also include a binder. The choice of binder materials may vary widely, so long as it is substantially inter with respect to the other cathode materials. Especially useful binders are those materials, usually polymeric, that allow for ease of processing of battery electrode materials. Examples of such materials are familiar to the person of skill in the art, and include, for example, polyethylene, polypropylenes, polyvinylidine fluorides, ethylene-propylene-diene rubbers, polyethylene oxides, UV-curable (meth)acrylates, and heat-curable divinyl ethers. The amount of binder, if present, can be, for example, in the range of about 2 wt % to about 30 wt % of the cathode, or in the range of about 4 wt % to about 25 wt % of the cathode.

The cathode may also include a current collector. Current collectors can be useful in efficiently collecting the electrical current generated throughout the cathode, and in providing an efficient surface for the attachment of electrical contacts leading to the circuitry of the electrochemical cell. A current collector can also provide support to the cathode. Examples of current collectors include metallized plastic films, metal foils, metal grids, expanded metal grids, metal mesh, metal wool, woven carbon fabric, woven carbon mesh, non-woven carbon mesh, and carbon felt.

The person of skill in the art will use conventional methods in the manufacture of the cathodes of the electrochemical cells according to this aspect of the invention.

As described above, the anode of the electrochemical cell of this aspect of the invention comprises metallic lithium. The lithium can be provided in a variety of forms, for example, lithium metal (in the form, e.g., of a foil, a wire, or as deposited onto a substrate), or a lithium alloy such as a lithium-aluminum alloy or a lithium-tin alloy.

Figure 3:
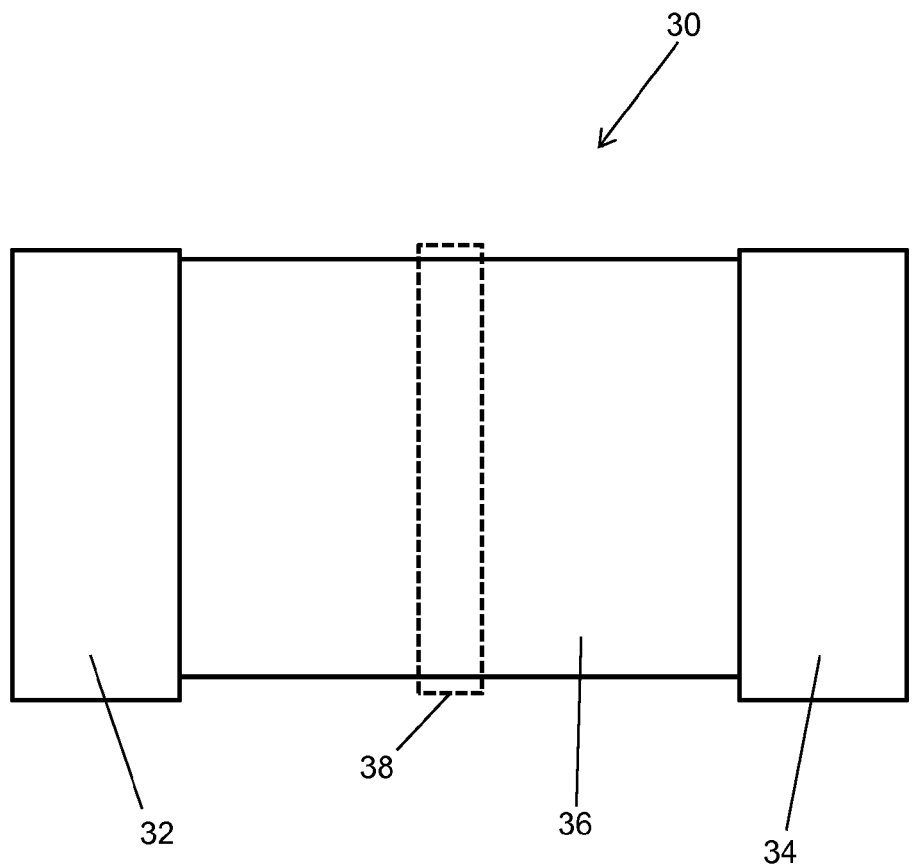
FIG. 3 is a schematic view of an electrochemical cell according to one embodiment of the invention.

The electrochemical cell may, in certain embodiments, and as shown in FIG. 3, further include a separator 38 interposed between the cathode and the anode. Typically the separator is a solid non-conductive or insulative material which separates or insulates the anode and the cathode from each other and which permits the transport of ions between the anode and the cathode. The pores of the separator may be partially or substantially filled with electrolyte. Separators may be supplied as free standing films which are interleaved with the anode(s) and the cathode(s) of an electrochemical cell. Alternatively the porous separator layer may be applied directly to the surface of one of the electrodes. A variety of separator materials are known in the art, for example, polyolefins (e.g., polyethylenes and polypropylenes) glass fiber filter and ceramic materials. Solid polymer electrolytes and gel polymer electrolytes may also function as a separator in addition to their electrolyte function; in such cases, an additional separator may not be necessary. In one embodiment the solid porous separator is a porous polyolefin separator. In one embodiment the solid porous separator comprises a microporous xerogel layer such as for example a microporous pseudo boehmite layer.

Figure 4:
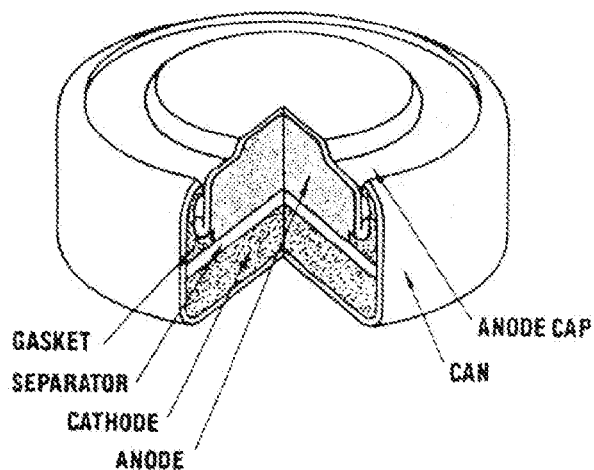
FIG. 4 is a schematic view of a coin cell.

The anodes, cathodes and electrolytes and optional separator may be assembled into cells or batteries by any of the methods known to those skilled in the art such as for example winding or stacking. Cells or batteries of the present invention may be made in a variety of sizes and configurations which are known to those skilled in the art. These battery design configurations include but are not limited to planar, prismatic, jelly roll, w-fold, stacked and the like. In certain embodiments, for example, the electrochemical cell is formed as a coin cell, as shown in schematic view in FIG. 4, or a pouch cell.

The examples described below further demonstrate the practice of various aspects of the invention, but are not intended to limit the scope of the invention as claimed.

EXAMPLES

Example 1

Viscosity Modification of Elemental Sulfur

In one experiment, mixtures of sulfur (provided as $S_8$ herein unless otherwise described, 600 mg) with various weight percents of triphenylphosphine (TPP) (2.5, 5, 7.5 and 10 wt % TPP with respect to sulfur) were prepared in 4 mL vials each equipped with a stir bar. The mixtures were heated at 185° C. and stirred at 550 rpm. Their viscosities were assessed qualitatively, and the mixtures containing 7.5 wt % and 10 wt % TPP had markedly lowered viscosities, and remained stirrable.

In another experiment, powdered sulfur (0.700 g, 2.19× $10^{-2}$ mol) and benzyl methacrylate (0.0105 g, 10.1 µL, 5.96× $10^{-5}$ mol, 1.5 wt % with respect to total mass) were combined in a 4 mL vial equipped with a stir bar. The vial was sealed and heated at 185° C. while stirring at 550 rpm. The viscosity was assessed visually to be less than that of powdered sulfur alone treated under the same conditions.

Example 2

Copolymerization of Viscosity-Modified Sulfur with Divinylbenzene

In a 4 mL vial equipped with a stir bar were combined powdered sulfur (0.360 g, 1.13×$10^{-2}$ mol) and TPP (0.40 g, 1.53×$10^{-4}$ mol). The vial was loosely capped and then heated at 185° C. with stirring at 550 rpm. The solids were allowed to melt and form a homogeneous liquid. The cap was then removed and divinylbenzene (commercial grade, mixture of 1,3- and 1,4-isomers) (0.198 g, 0.217 mL, 1.52×$10^{-3}$ mol) was injected and the cap was quickly replaced and secured tightly. The mixture was allowed to stir until gelation prevented further stirring, then the vial was cooled to room temperature.

Example 3

Copolymerization of Viscosity-Modified Sulfur with 1,3-Diisopropenylbenzene

In a 4 mL vial equipped with a stir bar were combined powdered sulfur (0.360 g, 1.13×$10^{-2}$ mol) and TPP (0.40 g, 1.53×$10^{-4}$ mol). The vial was loosely capped and heated at 185° C. with stirring at 550 rpm. The solids were allowed to melt and form a homogeneous liquid. The cap was then removed and 1,3-diisopropenylbenzene (DIB) (0.198 g, 0.217 mL, 1.25×$10^{-3}$ mol) was injected and the cap was quickly replaced and secured tightly. The mixture was allowed to stir until gelation prevented further stirring, then the vial was cooled to room temperature.

Example 4

Copolymerization of Viscosity-Modified Sulfur with 1,3-Diisopropenylbenzene and 1,10-Decanediol Dimethacrylate In a 4 mL vial equipped with a stir bar were combined powdered sulfur (0.390 g, 1.22×$10^{-2}$ mol) and TPP (0.060 g, 2.29×$10^{-4}$ mol). The vial was loosely capped and heated at 185 C with stirring at 550 rpm. The solids were allowed to melt and form a homogeneous liquid. The cap was then removed and DIB (0.075 g, 81.1 µL, 2.86×$10^{-4}$ mol) and 1,10-decanediol dimethacrylate (0.075 g, 2.42×$10^{-4}$ mol) were simultaneously injected and the cap was quickly replaced and secured tightly. The mixture was allowed to stir until gelation prevented further stirring, then the vial was cooled to room temperature.

Example 5

Figure 5:
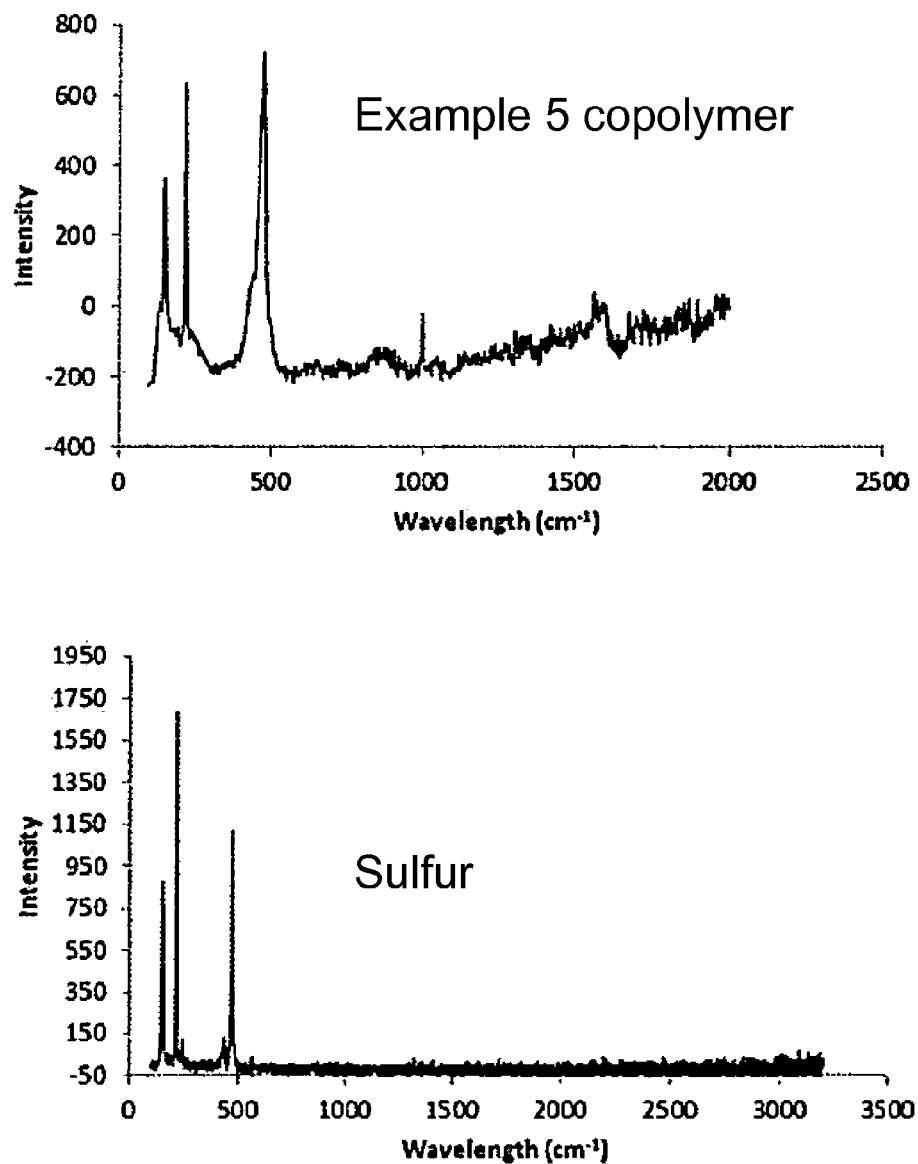
FIG. 5 provides Raman spectra of the copolymer of Example 5 and sulfur.
Figure 6:
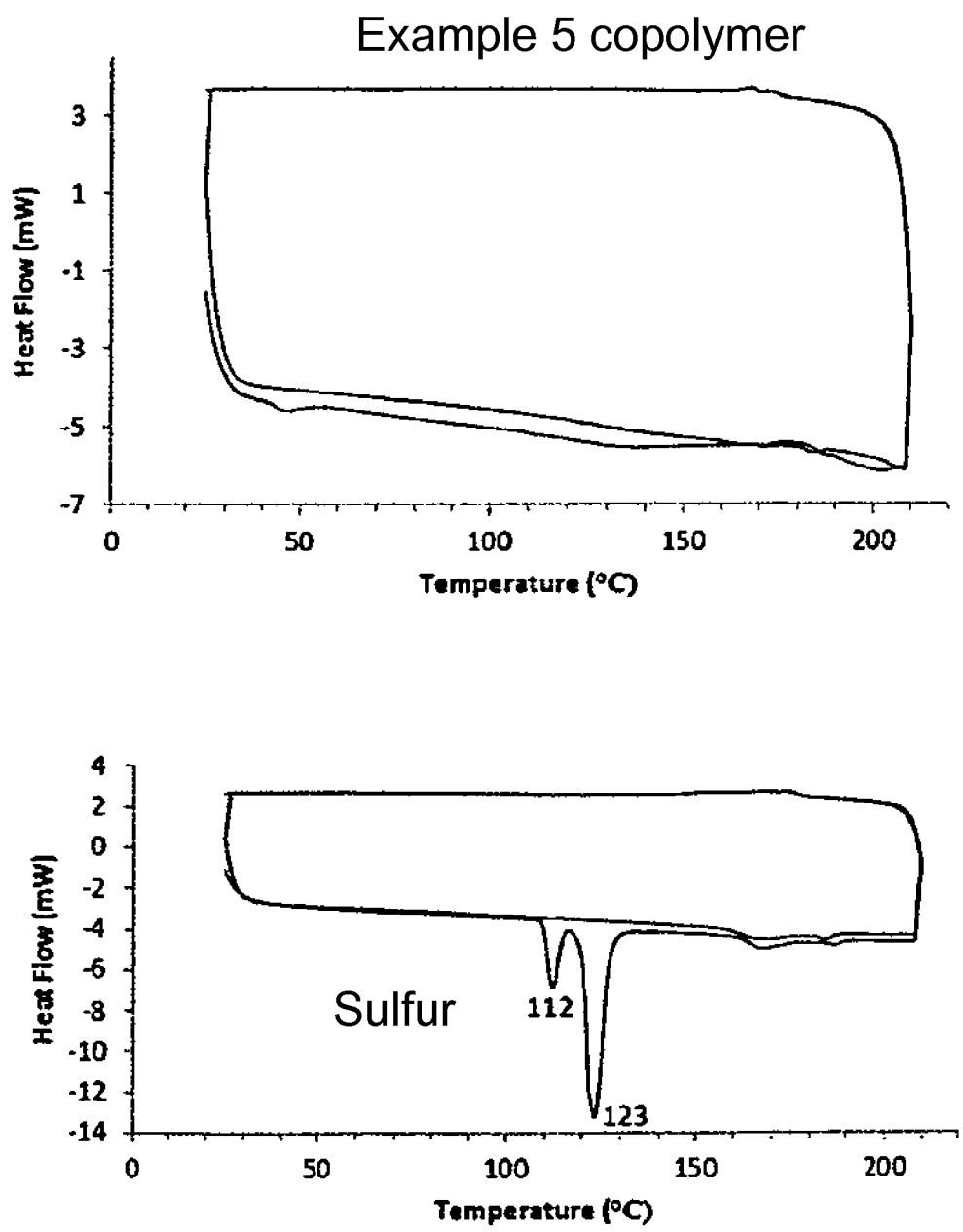
FIG. 6 provides DSC thermograms of the copolymer of Example 5 and sulfur.

Copolymerization of Sulfur with 1,3-Diisopropenylbenzene and Benzyl Methacrylate To a 4 mL vial equipped with a stir bar was added powdered sulfur (0.54 g, 2.10×$10^{-3}$ mol). The vial was heated at 185° C. until a clear orange-colored molten phase was formed. Benzyl methacrylate (0.063 g, 60.6 µL, 0.357×$10^{-3}$ mol) was then directly added to the molten sulfur via syringe. The sulfur and benzyl methacrylate were allowed to homogenize, then DIB (0.297 g, 0.321 mL, 1.88×$10^{-3}$ mol) was directly added to the molten mixture via syringe. The resulting mixture was stirred at 185° C. until a deep cherry red solution resulted and the entire reaction vitrified. Once vitrified the reaction was cooled to room temperature. The resulting copolymer had a sulfur level of 60%, a DIB level of 33%, and a benzyl methacrylate level of 7 wt %. Raman spectra and DSC thermograms of the resulting copolymer and of elemental sulfur are provided in FIGS. 5 and 6, respectively. The Raman and DSC data indicate substantially complete copolymerization.

Example 6

DSC, Kinetics, and Thermal and Rheological Properties

Figure 7:
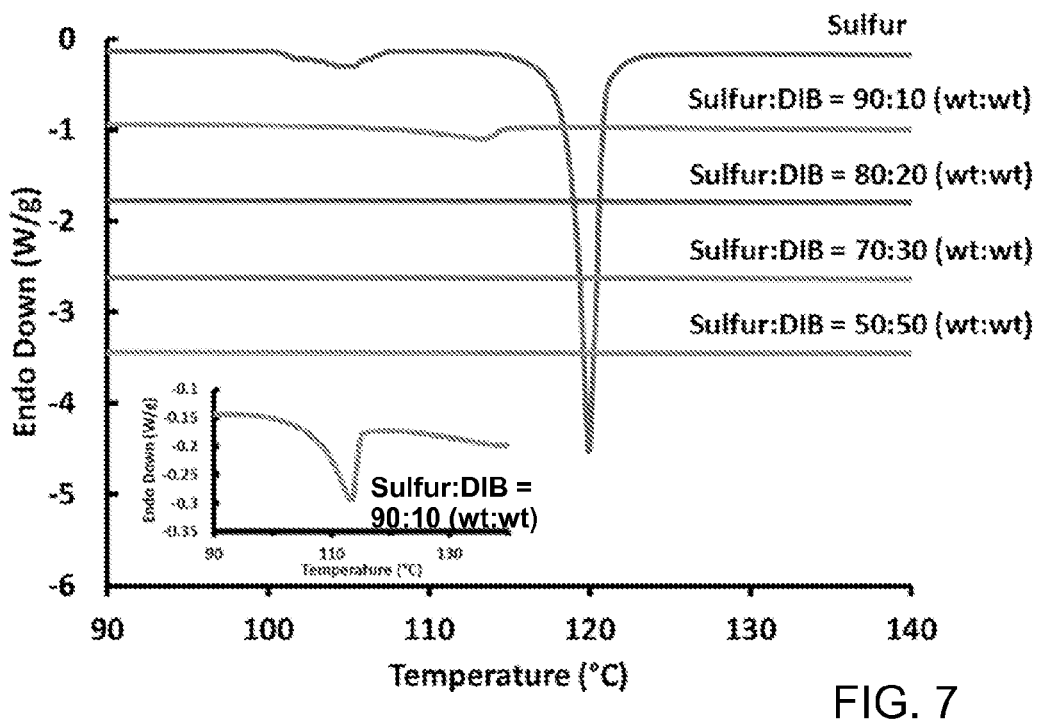
FIGS. 7 and 8 provide DSC data for the varying sulfur content polymers of Example 6.

Sulfur:DIB polymers of varying sulfur content were made by heating mixtures of sulfur and DIB at 185° C. The resulting polymers were studied by DSC, along with sulfur; thermograms are provided in FIG. 7. The sulfur melting endotherm was not present in any of the polymerized material. The 90 wt % sulfur material also did not have residual unreacted $S_8$ monomer, but due to the high sulfur content in the sulfur copolymer exhibited a weak endotherm corresponding to melting of semi-crystalline domains present in sulfur rich polymers.

Figure 8:
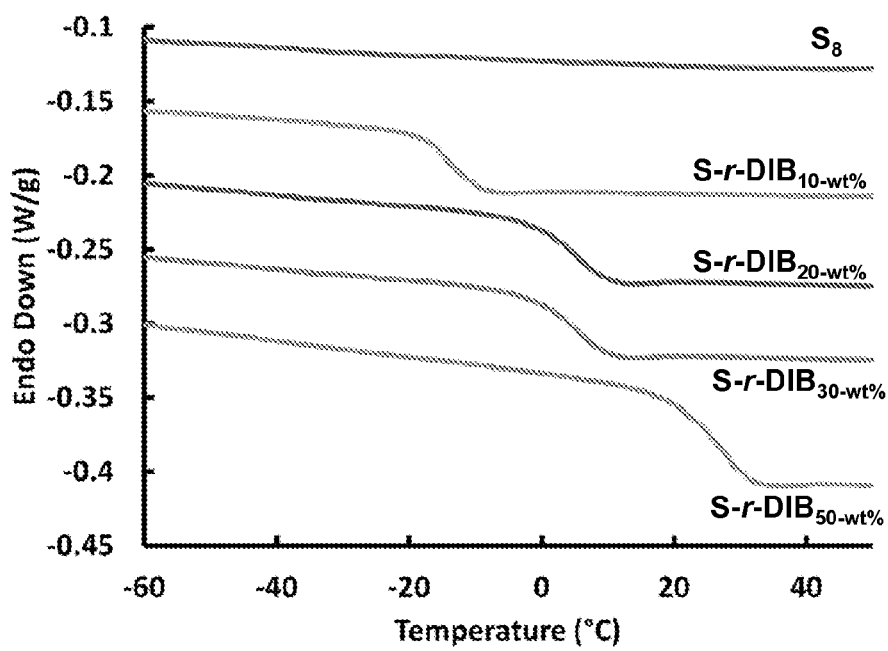

DSC data in the range of −60° C. to 40° C. are provided in FIG. 8. The glass transition temperature increases with increasing DIB content.

Figure 9:
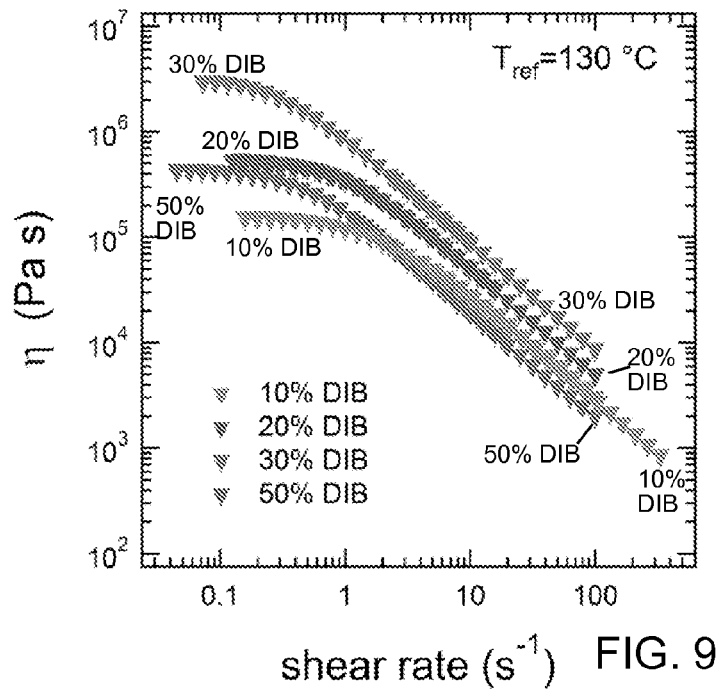
FIG. 9 provides shear viscosity data for the varying sulfur content polymers of Example 6.

Shear viscosity data are provided in FIG. 9. Increasing DIB increases zero-shear viscosity until between 30 wt % and 50 wt %, where the zero-shear viscosity increases. While not intending to be bound by theory, the inventors surmise that hyperbranching results in lower viscosity around 50 wt % DIB.

Figure 10:
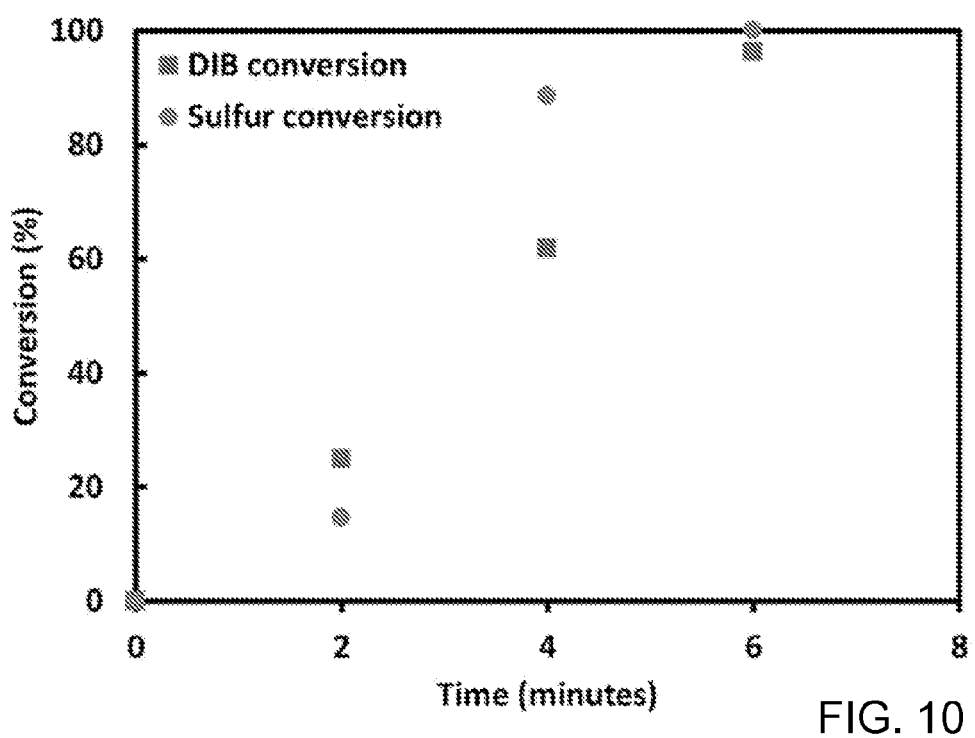
FIG. 10 provides kinetic data for the rate experiment of Example 6.

A 50:50 mixture of $S_8$ and DIB was heated at 185° C., and samples were obtained every two minutes, cooled quickly, and analyzed via Raman spectroscopy and DSC for sulfur conversion, and $^1$H NMR for DIB vinyl group conversion. Results are shown in FIG. 10, and demonstrate complete reaction within 6 minutes.

Example 7

Preparation of Sulfur/Propylene Sulfide Copolymers

Polymerizations of sulfur and propylene sulfide can be performed using a procedure similar to that described below: polymerizations were carried out with benzyl dithiobenzoate (BDB) as an initiator in a degassed sealed Schlenk flask. Propylene sulfide (0.88 mL, 11.232×10$^{-3}$ mol), sulfur (0.7188 g, 2.808×10$^{-3}$ mol), BDB (34.2 mg, 0.1404×10$^{-3}$ mol), tetraphenylphosphonium chloride (10.53 mg, 0.02808×10$^{-3}$ mol), and 10 mL toluene were placed in a Schlenk flask, and degassed by three freeze-pump-thaw cycles, then the mixture was stirred at 80° C. for 8 h under argon. The polymer obtained was purified by precipitation from toluene into a large excess of methanol, and dried in vacuum to give a pale red oil polymer.

Figure 11:
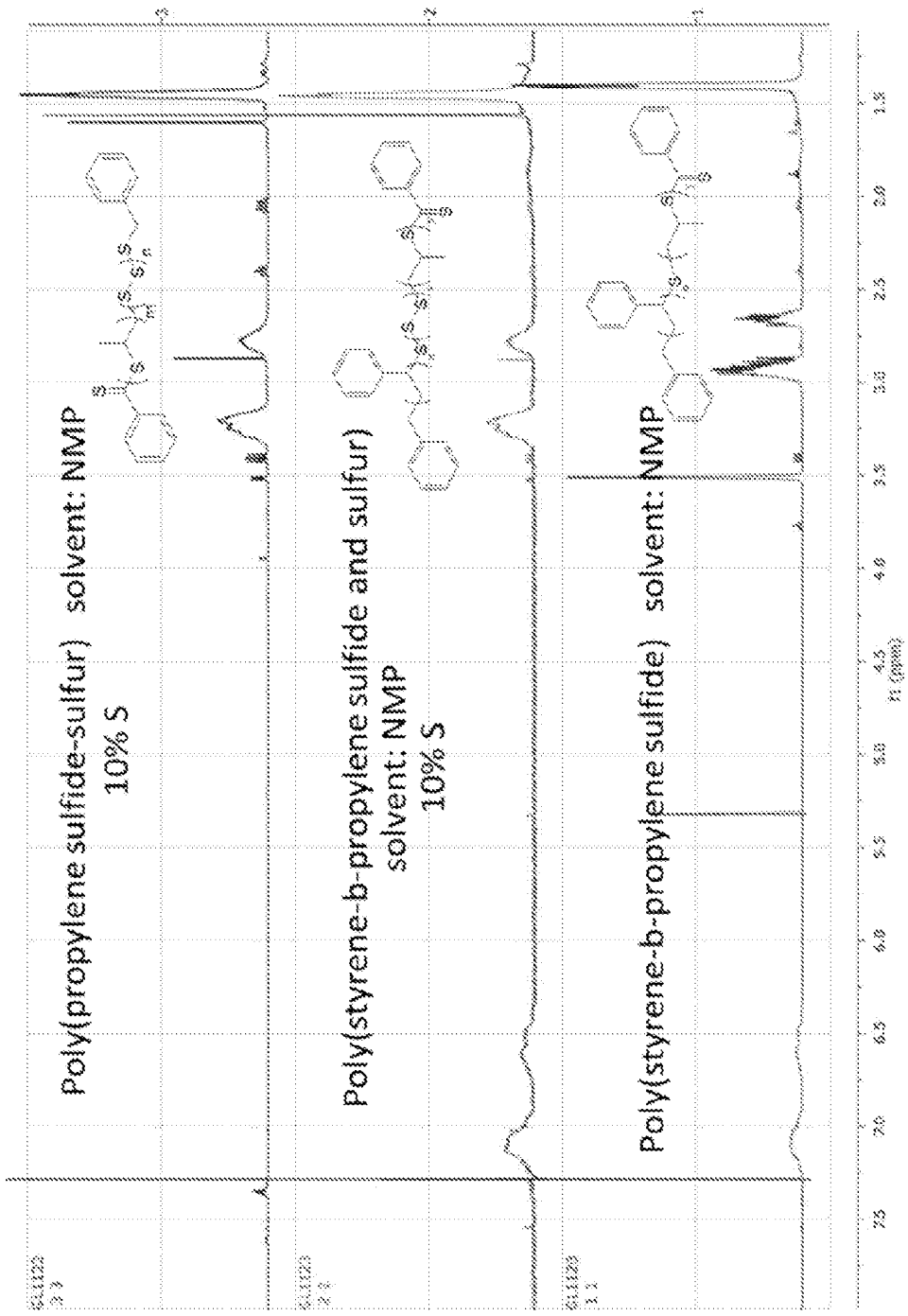
FIG. 11 provides NMR spectra of sulfur/thiirane polymers of Example 7 as compared to a copolymer not containing sulfur.

FIG. 11 provides NMR spectra of two sulfur/thiirane copolymers as compared to a copolymer not containing sulfur. The resonances at 2.5-3.0 ppm shift with increased sulfur content. Similarly, SEC measurements demonstrated sulfur incorporation into the polypropylene backbone, with a broad range of apparent molecular weights (1,000-100,000 g/mol).

Example 8

Formation of Sulfur/DIB Prepolymer Solution

In a 20 mL vial equipped with a stir bar were added powdered sulfur (1.2 g, 3.75×10$^{-2}$ mol) and triphenylphosphine (0.140 g, 5.34×10$^{-4}$ mol). The vial was loosely capped and heated at 185° C. with stirring at 550 rpm. The solids were allowed to melt and form a homogeneous liquid. The cap was then removed and DIB (0.660 g, 0.714 mL, 3.64×10$^{-3}$ mol) was injected and the cap was quickly replaced and secured tightly. Once the mixture began to darken to an amber color (after about 2-3 minutes) the cap was removed and 1,2,4-trichlorobenzene (TCB) (0.660 g, 0.714 mL) was injected. The vial was sealed and the mixture was stirred for 2-3 minutes until bright red in color, then cooled to room temperature to form a viscous prepolymer solution.

Example 9

Formation of Polymer Structures

Figure 12:
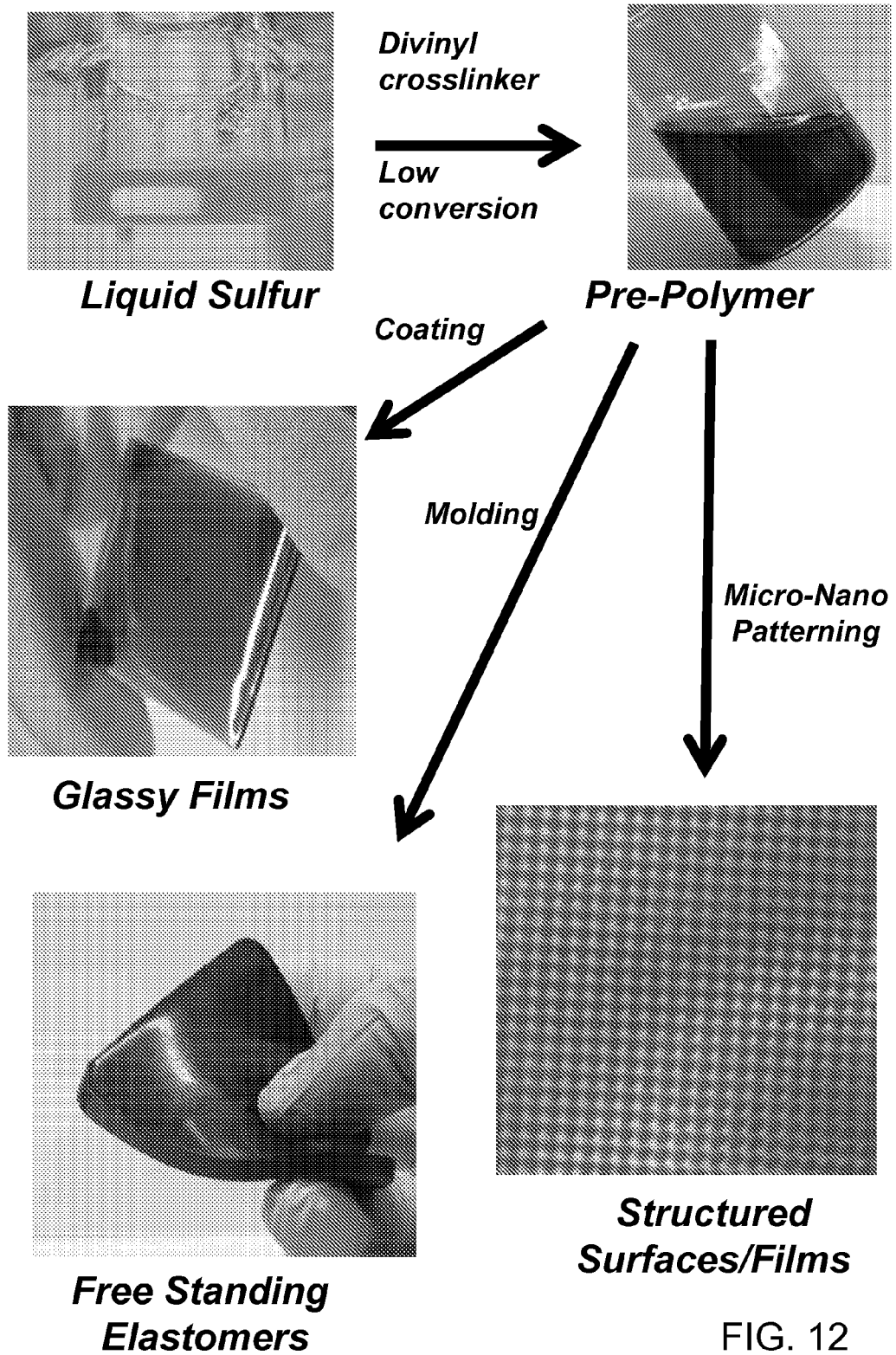
FIG. 12 provides a set of pictures of articles fabricated as described in Example 9.

Hot prepolymer solutions as described above were poured into Teflon molds of various geometries and cured at 200° C. to form free-standing elastomer structures, an example of which is shown in FIG. 12.

Glassy thin films were prepared by drop casting the prepolymer solution as described above onto a glass slide and curing at 200° C. An example is shown in FIG. 12.

Microstructures were formed by pouring the prepolymer solution as described above into PDMS molds having pillared features (having micrometer periodicity) and curing at 200° C. An example is shown in FIG. 12.

Figure 13:
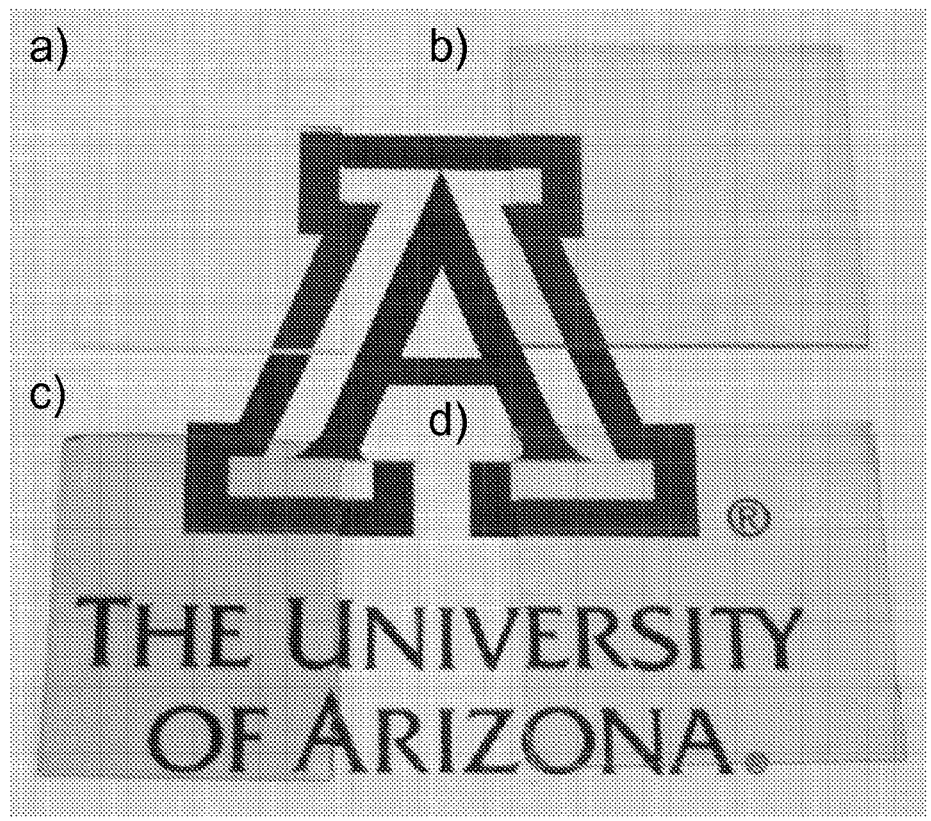
FIG. 13 provides a set of pictures of spin-coated films fabricated as described in Example 9.
Figure 14:
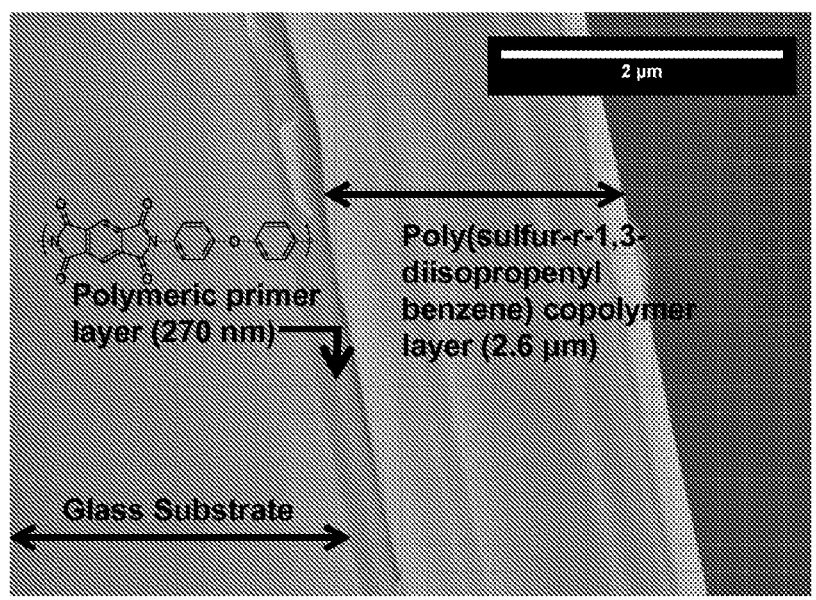
FIG. 14 is a cross-sectional micrograph of a spin-coated films fabricated as described in Example 9.

FIG. 13 is a picture of a set of spin-coated films. Film (a) was spun from 10× diluted poly(pyromellitic dianhydride-co-4,4'-oxodianiline) amic acid solution in N-methylpyrrolidinone (NMP), and film (b) was spun from neat poly(pyromellitic dianhydride-co-4,4'-oxodianiline) amic acid solution. Film (c) is 17.5-wt % DIB poly(S-r-DIB) film spun onto film (a); and film (d) is 20-wt % DIB poly(S-r-DIB) film spun onto film (b). Samples a) and b) were cured at 190° C. under vacuum (−28 in. Hg) for 2 hours. Samples c) and d) were cured at 180° C. under vacuum (−28 in. Hg) for 10 minutes and then at the same temperature without vacuum for an additional 10 minutes. FIG. 14 is a cross-sectional micrograph of a poly(S-r-DIB) copolymer layer (2.6 μm in thickness) formed on a polyimide layer (270 nm) on a glass substrate.

Example 10

Formation of Oil-in-Water Emulsions

Deionized water (30 mL) in a vial equipped with a stir bar was heated on a stir plate at 85 C with stirring at 1600 rpm. To the vial as added poly(4-styrenesulfonic acid ammonium salt (30% in water, 1 mL). In a separate vial was prepared a 72.5 wt % sulfur/DIB prepolymer in hot 1,2,4-trichlorobenzene (TCB) as described above in Example 8 to the stirring poly (4-styrenesulfonic acid ammonium salt solution was added 0.1 mL of the prepolymer solution, followed by the addition of TRITON X 100 nonionic surfactant (0.5 mL), which instantly formed an opaque emulsion.

Example 11

Large Scale Preparation of Sulfur/DIB Copolymer

To a 60 mL glass vial equipped with a magnetic stir bar was added sulfur (17.50 g, 6.82×10$^{-2}$ mol), which was heated at 185° C. in a thermostated oil bath until a clear orange colored molten phase was formed. DIB (7.5 g, 8.11 mL, 5.848×10$^{-2}$ mol) was then directly added to the molten sulfur medium via syringe. The resulting mixture was stirred at 185° C. until a deep cherry red liquid resulted. At this point the liquid was poured from into a glass petri dish (150 mm) and covered with a piece of TEFLON-coated aluminum foil. The covered petri dish was then placed into a hot press heated at 185° C. The upper plate of the press was lowered to gently press the foil to the rim of the petri dish to prevent reactant evaporation and uniformly heat the sample. The sample was cured until completely vitrified and then cooled to room temperature to yield a poly(sulfur-random-(1,3-diisopropenylbenzene) (poly(S-r-DIB)) copolymer in film form.

Example 12

Preparation of Micropatterned Poly(S-r-DIB)

Figure 15:
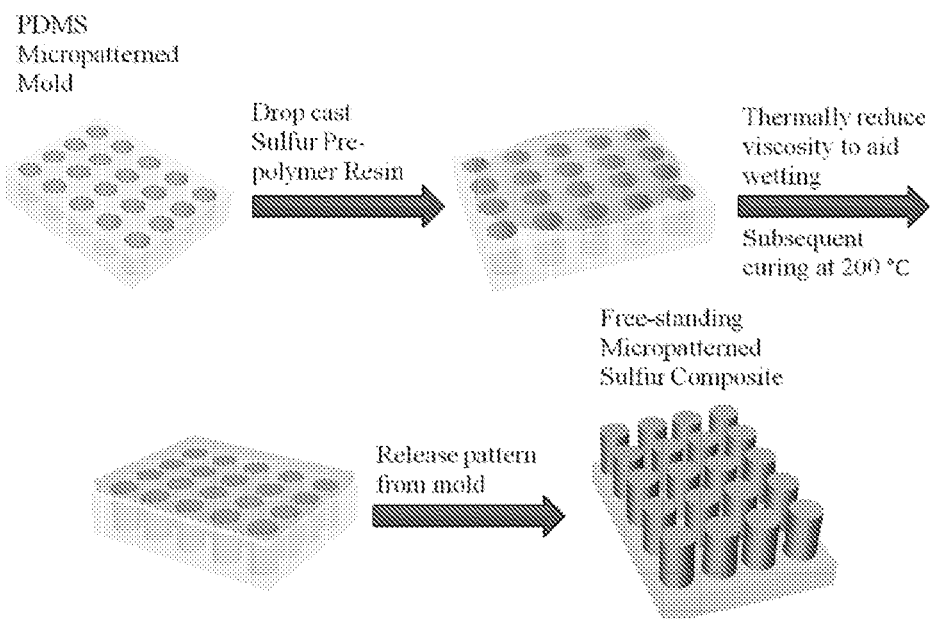
FIG. 15 is a schematic view of the method described in Example 12.
Figure 16:
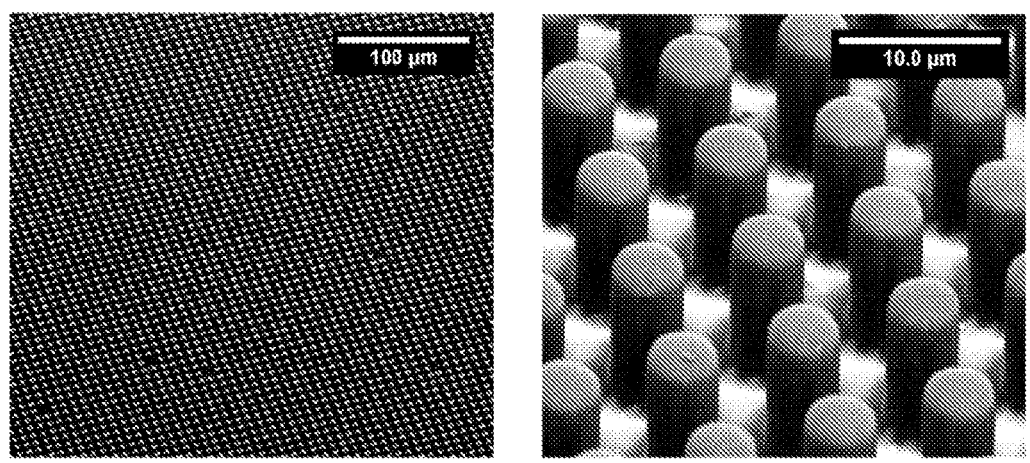
FIG. 16 is a set of micrographs of the micropatterned material of Example 12.
Figure 16:
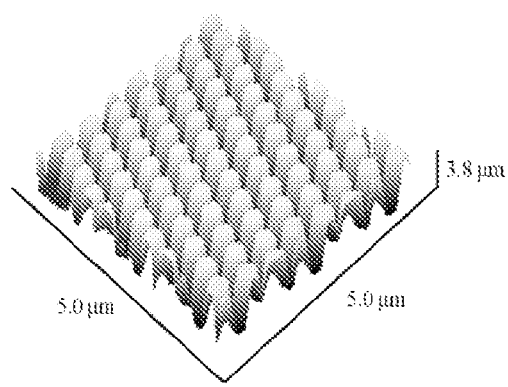

To a 24 mL glass vial equipped with a magnetic stir bar was added sulfur (3.50 g, 13.7×10$^{-3}$ mol) and the vial was then heated at 185° C. in a thermostated oil bath until a clear orange colored molten phase was formed. 1,3-Diisopropenylbenzene (1.50 g, 9.48×10$^{-3}$ mol) was added to the molten sulfur and the resulting mixture was further heated at 185° C. for a few minutes to form a viscous red colored prepolymer resin. The viscous liquid was placed onto a micropatterned PDMS mold and then immediately placed in an oven heated at 200° C. and cured for 30 minutes, cooled to room temperature and removed carefully from the PDMS mold to yield a micropatterned poly (S-r-DIB) material. The method is shown in schematic form in FIG. 15, and micrographs of the patterned material are provided in FIG. 16.

Example 13

Reprocessing of Already-Cured Materials

In a vial equipped with a stir bar were combined cured sulfur/DIB copolymer (18.0352 g) and TCB (2.62 g, 1.80 mL) (prepared as described above in Example 11). The vial was loosely capped and heated at 195° C. with stirring at 550 rpm. The solids were allowed to melt to form a homogeneous liquid with the TCB. The solution was placed into a TEFLON mold and cured at 215° C. until sufficiently cross-linked to form sold. The sample was cooled and removed from the mold.

Example 14

Preparation of Graphene Oxide-Containing Nanocomposites

In a 4 mL vial equipped with a stir bar were combined powdered sulfur (0.650 g, $2.03 \times 10^{-2}$ mol), pyrene (0.250 g, $1.24 \times 10^{-3}$ mol) and powdered graphene oxide (0.100 g) previously prepared by the Hummer method. The vial was tightly capped and heated at 195° C. with stirring at 550 rpm. Once the sulfur had melted and the mixture had ceased foaming, heating was stopped and the vial was cooled to solidify the mixture. Any material clinging to the walls of the vial was scraped down, then the vial was resealed and heated again at 195° C. for 3 min with stirring at 550 rpm. Once the material was homogeneously mixed the vial was cooled to room temperature to form a dispersion of graphene oxide in sulfur.

In a vial equipped with a stir bar was placed the graphene oxide dispersion described above (0.400 g). The vial was loosely capped and heated at 185° C. with stirring at 550 rpm. When the sulfur had liquefied, the cap was removed and divinylbenzene (0.100 g, 0.109 mL, $7.68 \times 10^{-4}$ mol) was injected and the cap quickly replaced and secured tightly. The mixture was allowed to stir until gelation prevented further stirring and then the vial was cooled to room temperature to yield a polymeric composition having graphene oxide dispersed in the sulfur/DIB copolymer.

Example 15

Preparation of Carbon Fiber-Containing Nanocomposites

In a 4 mL vial equipped with a stir bar were combined powdered sulfur (0.700 g, $2.19 \times 10^{-2}$ mol), pyrene (0.250 g, $1.38 \times 10^{-3}$ mol) and carbon nanofibers (0.020 g). The vial was tightly capped and heated at 195° C. with stirring at 550 rpm. Once the sulfur had melted and the mixture appeared homogeneous heating was stopped and the vial was cooled to solidify the mixture. Any material clinging to the walls of the vial was scraped down, then the vial was resealed and heated again at 195° C. for 3 min with stirring at 550 rpm. Once the material was homogeneously mixed the vial was cooled to room temperature to form a dispersion of carbon nanofibers in sulfur.

In a vial equipped with a stir bar was placed the carbon nanofiber dispersion described above (0.240 g). The vial was loosely capped and heated at 185° C. with stirring at 550 rpm. When the sulfur had liquefied, the cap was removed and divinylbenzene (0.0896 g, 0.098 mL, $6.88 \times 10^{-4}$ mol) was injected and the cap quickly replaced and secured tightly. The mixture was allowed to stir until gelation prevented further stirring and then the vial was cooled to room temperature to yield a polymeric composition having carbon nanofibers dispersed in the sulfur/DIB copolymer.

Example 16

Formation of High Refractive Index Optical Material

In a 4 mL vial equipped with a stir bar were combined powdered sulfur (0.675 g, $2.11 \times 10^{-2}$ mol) and benzyl methacrylate (0.135 g, 0.130 mL, $7.66 \times 10^{-5}$ mol). The vial was loosely capped and heated at 185° C. with stirring at 550 rpm. When the sulfur had liquefied, the cap was removed and divinylbenzene (0.212 g, 0.229 mL, $1.34 \times 10^{-3}$ mol) was injected and the cap quickly replaced and secured tightly. The solution was allowed to stir for 1:13 before being poured onto a TEFLON-coated foil being held at 200° C. A petri dish was placed over the sample and it was cured at 200° C. to form an optically clear film.

Figure 17:
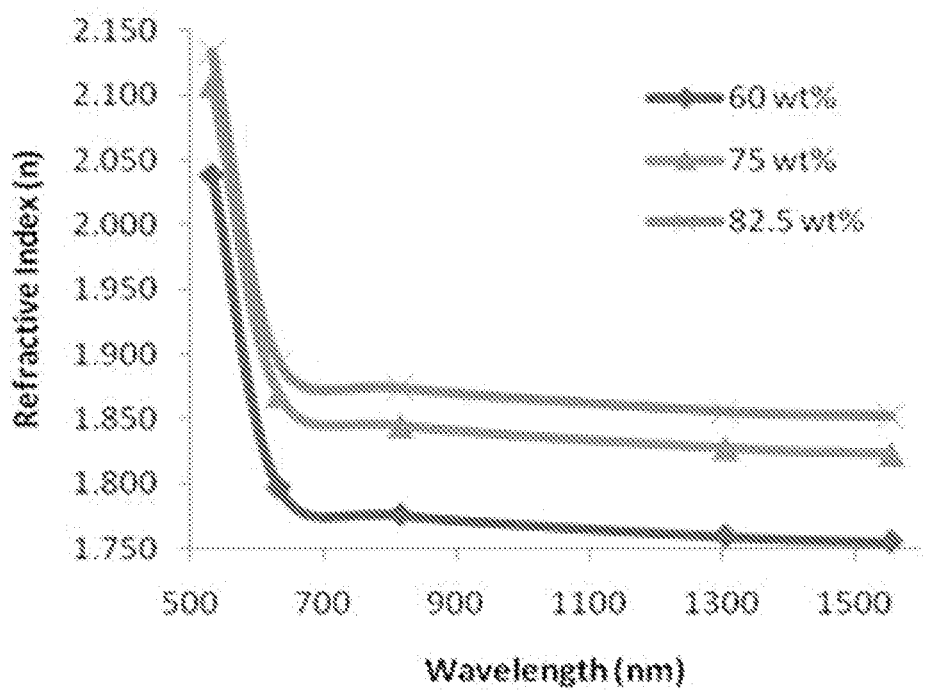
FIG. 17 provides refractive index data for materials of Example 16.
Figure 18:
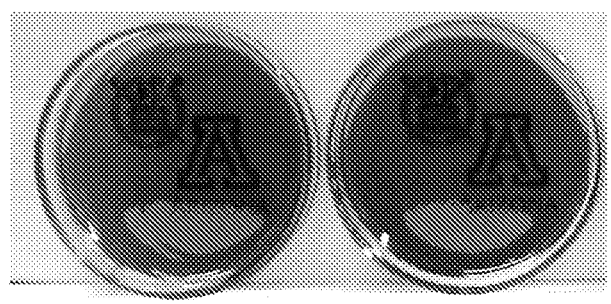
FIG. 18 is a picture of the samples of Example 16.
Figure 18:
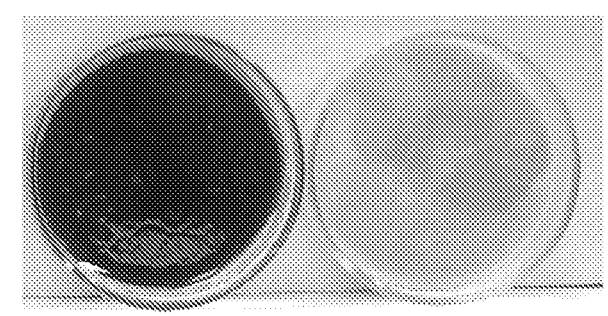

Refractive index data for polymers having 60, 75 and 82.5 wt % sulfur are provided in FIG. 17. A picture of thick samples of sulfur/DIB polymers having 10, 20 and 30 wt % DIB, and a similarly-processed sulfur sample is provided as FIG. 18.

Example 17

Fabrication and Testing of Electrochemical Cells

Figure 19:
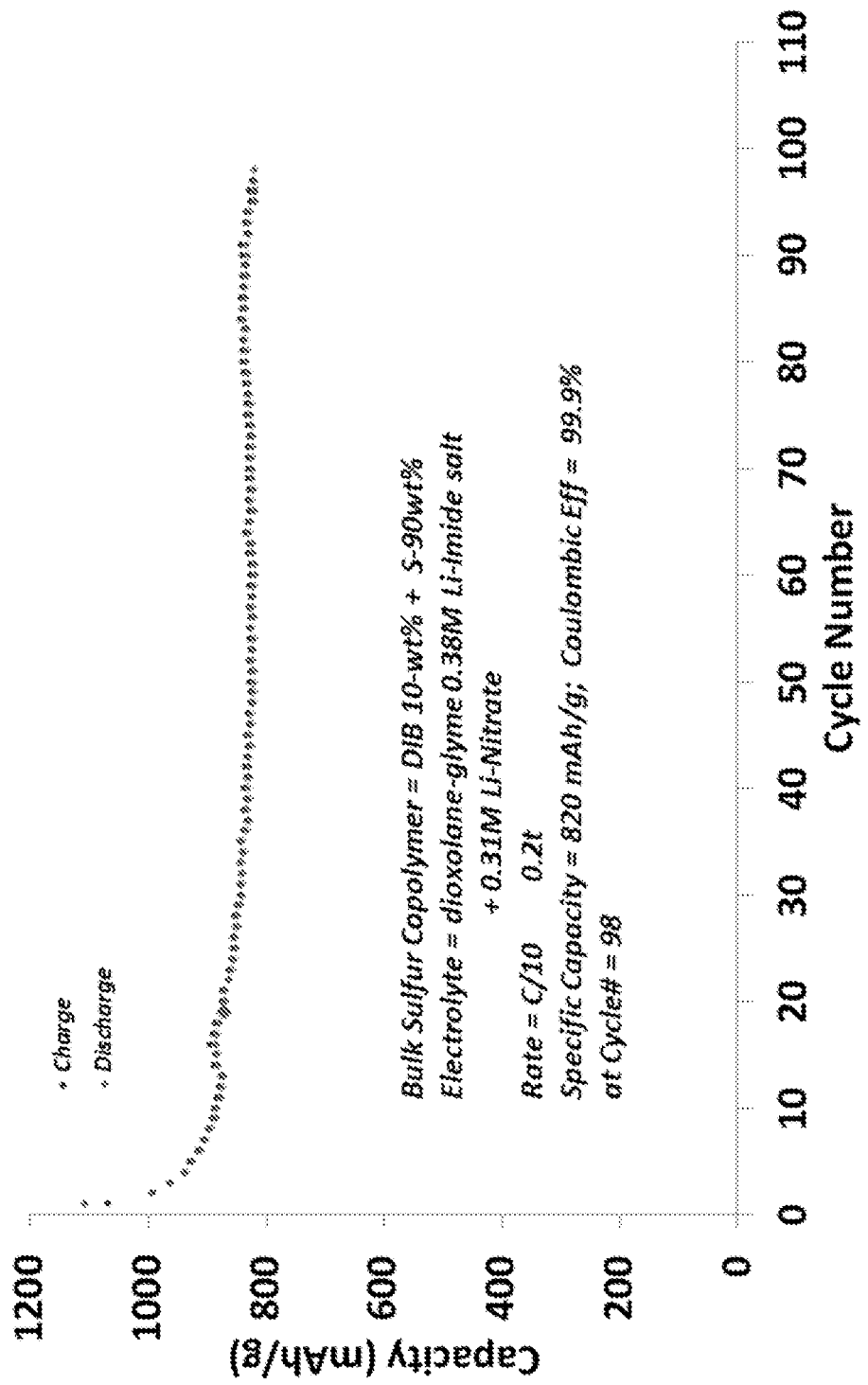
FIGS. 19 and 20 provide data for cycling experiments (C/10 and C/4) for the first device of Example 17.
Figure 20:
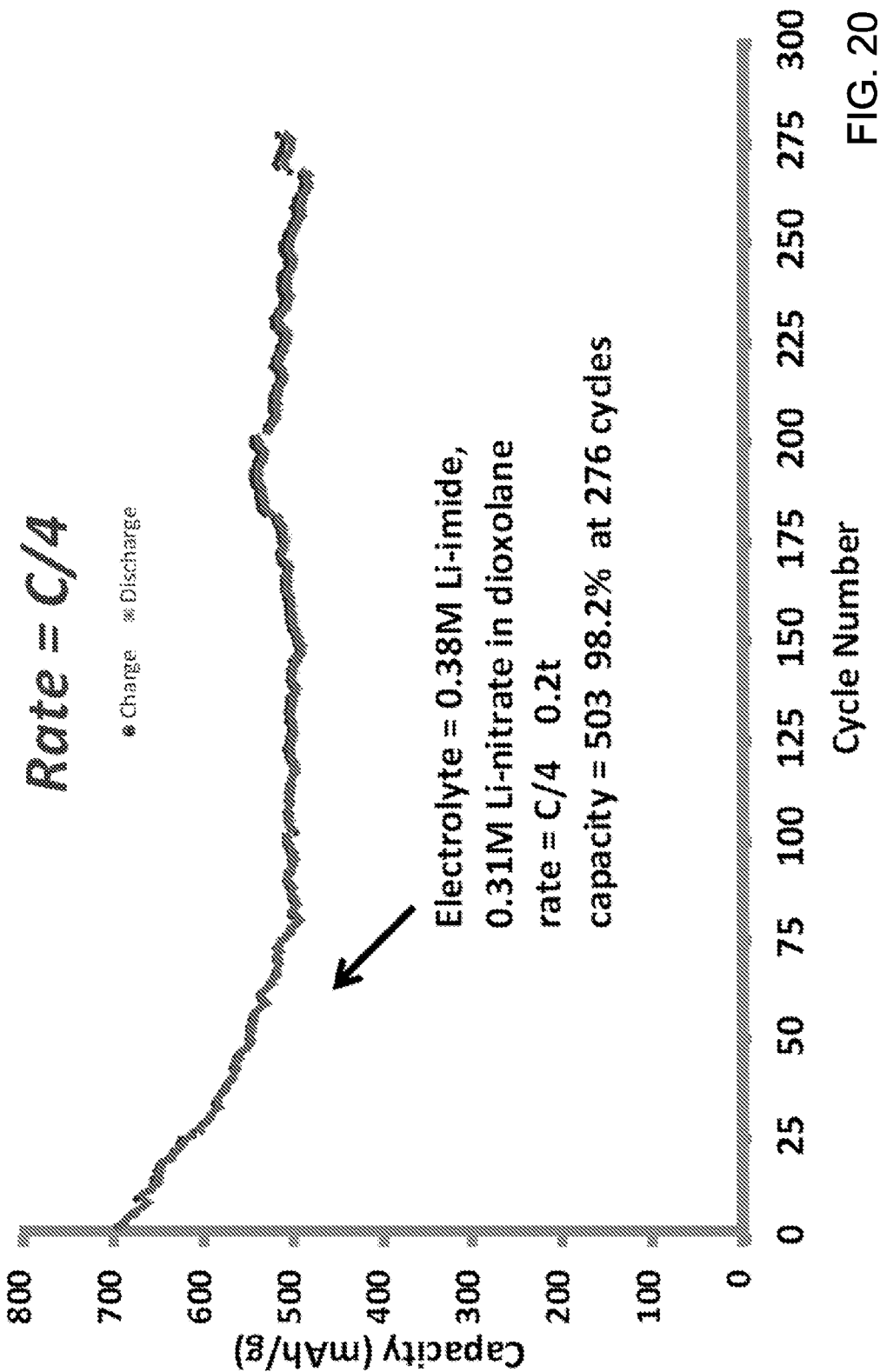
Figure 21:
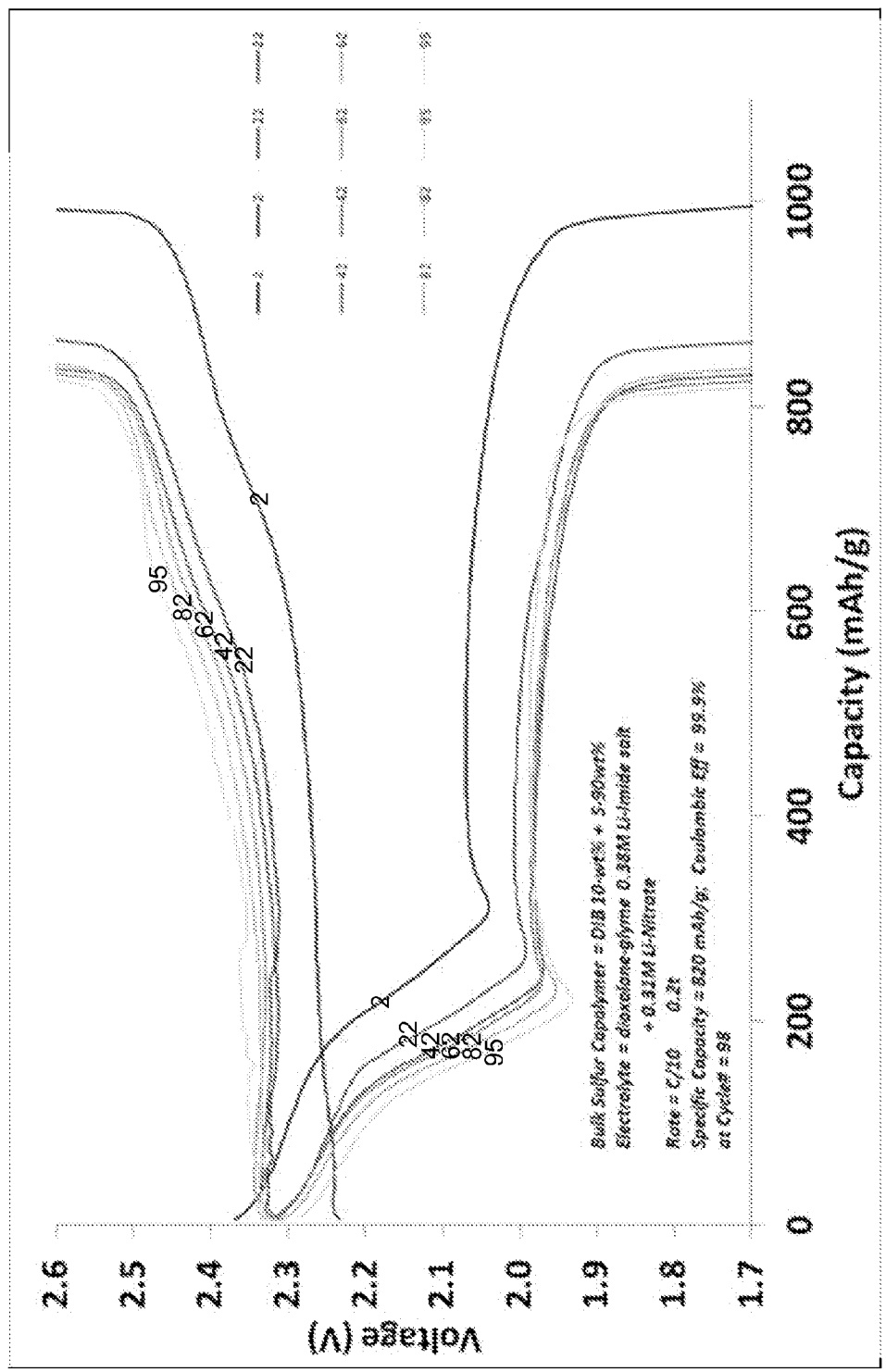
FIG. 21 provides data for cyclic voltammetry experiments for the first device of Example 17.

An example of an electrochemical cell was fabricated as follows. All electrochemical cells described in this example were fabricated in a similar manner Poly(S-r-DIB) (10-wt % DIB) was combined with conductive carbon (Timcal, Super C65) and 4000 g/mol Mw polyethylene (Aldrich) as a binder in a mass ratio of 75:20:5 respectively and milled into a slurry with chloroform (Aldrich). The slurry was then blade cast onto carbon coated aluminum foil and dried in air. This cathode was assembled into CR2032 coin cells with a polypropylene separator (Celgard) and lithium foil as the reference/counter electrode. The electrolyte used was 0.38 M lithium bis(trifluoromethane) sulfonimide (Aldrich), 0.31M lithium nitrate (Aldrich) in a 1:1 vol/vol mixture of 1,3-dioxolane (Novolyte) and 1,2-dimethoxy ethane (Novolyte). Cyclic voltammetry experiments were performed on a CH instruments 600 potentiostat at a scan rate of 20 µV/s from 2.8 to 1.5 V. Battery cycling experiments were performed on an Arbin BT2000 battery tester at a rate of C/10 (167 mA/g sulfur) from 1.7 to 2.6 V. FIGS. 19 and 20 provide data for cycling experiments (C/10 and C/4); and FIG. 21 provides data for cyclic voltammetry experiments. The data demonstrate low internal resistance, no loss of voltage during cycling, and an achievable specific capacity in the range of about 200 to about 1200 mAh/g.

Figure 22:
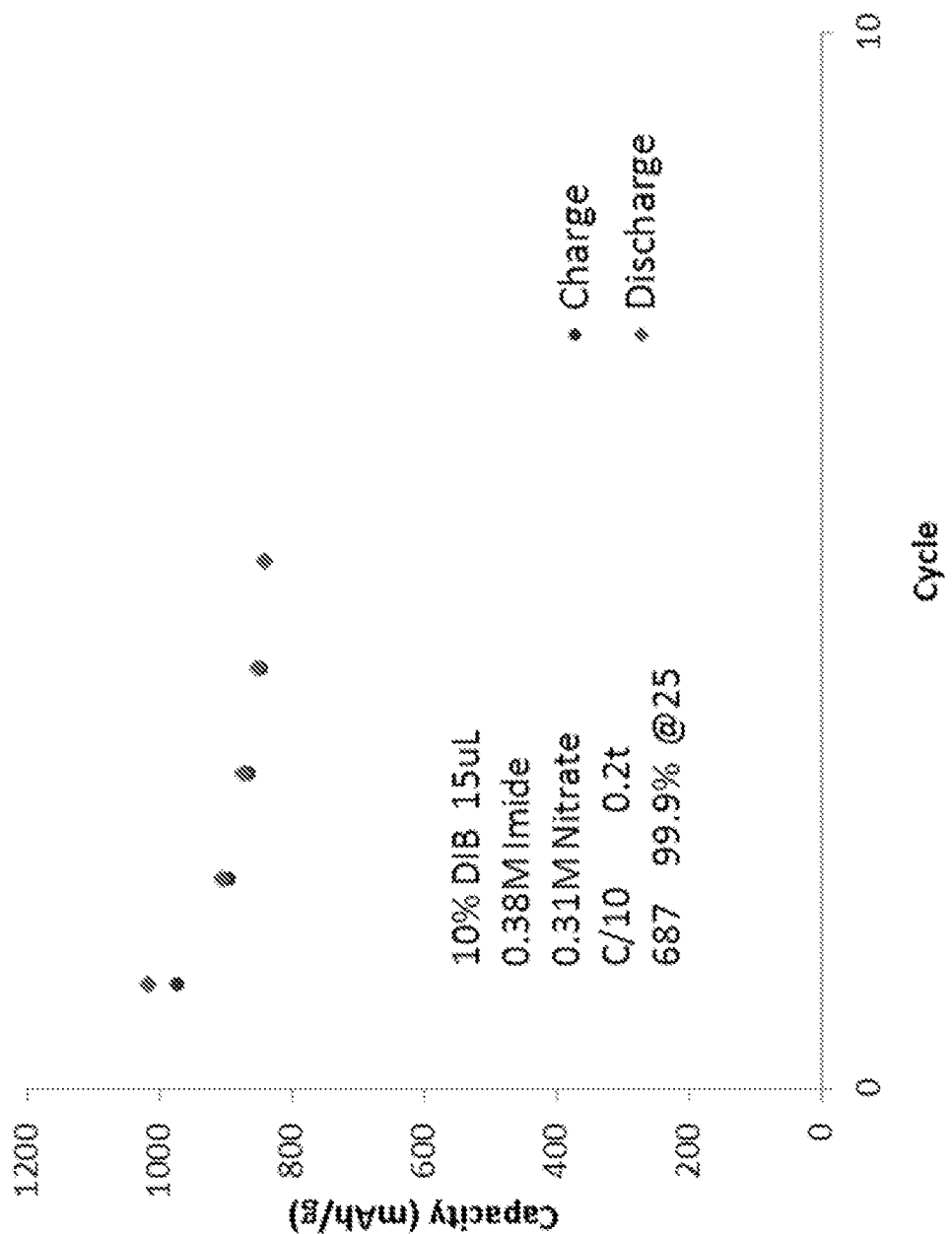
FIG. 22 is provides data for the cycling experiments (C/10) for the second device of Example 17.

A lithium/sulfur battery was constructed as described above was fabricated using an 80 wt % sulfur poly(propylene-r-sulfur) copolymer made as described in Example 7. Cycling experimental data is shown in FIG. 22, demonstrating an achievable specific capacity in the range of about 200 to about 1200 mAh/g.

Unless clearly excluded by the context, all embodiments disclosed for one aspect of the invention can be combined with embodiments disclosed for other aspects of the invention, in any suitable combination.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

We claim:

1. A polymeric composition comprising a copolymer of sulfur, at a level in the range of at least about 50 wt % of the copolymer, and one or more monomers of diisopropenylbenzene, at a level in the range of about 0.1 wt % to about 50 wt % of the copolymer.

2. The polymeric composition according to claim 1, wherein the one or more monomers are a combination of one or more monomers of diisopropenylbenzene and one or more epoxide monomers.

3. The polymeric composition of claim 1, wherein the copolymer comprises the sulfur at a level in the range of about 50 to about 99.9 wt % of the copolymer, and the one or more monomers at a level in the range of about 0.1 wt % to about 50 wt % of the copolymer.

4. The polymeric composition of claim 1, wherein the copolymer comprises the sulfur at a level in the range of about 50 to about 99 wt % of the copolymer, and the one or more monomers at a level in the range of about 1 wt % to about 50 wt % of the copolymer.

5. The polymeric composition of claim 1, wherein the copolymer comprises the sulfur at a level in the range of about 50 to about 97.5 wt % of the copolymer, and the one or more monomers at a level in the range of about 2.5 wt % to about 50 wt % of the copolymer.

6. The polymeric composition of claim 1, wherein the copolymer comprises the sulfur at a level in the range of about 50 to about 95 wt % of the copolymer, and the one or more monomers at a level in the range of about 5 wt % to about 50 wt % of the copolymer.

7. The polymeric composition of claim 1, wherein the copolymer comprises the sulfur at a level of at least about 60 wt % of the copolymer.

8. The polymeric composition of claim 1, wherein the copolymer comprises the sulfur at a level of at least about 70 wt % of the copolymer.

9. The polymeric composition of claim 1, wherein the copolymer comprises the sulfur at a level in the range of about 70 to about 92 wt % of the copolymer.

10. The polymeric composition according to claim 9, wherein the copolymer comprises the one or more monomers at a level in the range of about 8 wt % to about 30 wt % of the copolymer.

11. The polymeric composition of claim 1, wherein the one or more monomers further includes at least one polyfunctional monomer.

12. The polymeric composition of claim 11, wherein the at least one polyfunctional monomer includes one or more of a polyvinyl monomer, a polyisopropenyl monomer, a polyacryl monomer, a polymethacryl monomer, a polyunsaturated hydrocarbon monomer, a polyepoxide monomer, or a polythiirane monomer.

13. The polymeric composition of claim 11, wherein the at least one polyfunctional monomer includes one or more of a divinylbenzene, an alkylene di(meth)acrylate, a bisphenol A di(meth)acrylate, a terpene, a carotene, a divinyl (hetero) aromatic compound and a diisopropenyl (hetero)aromatic compound.

14. The polymeric composition according to claim 1, wherein the copolymer further comprises a nucleophilic viscosity modifier at a level up to about 10 wt % of the copolymer.

15. The polymeric composition according to claim 1, wherein the copolymer comprises
sulfur, at a level of about 50 to about 98 wt % of the copolymer,
further includes one or more polyfunctional monomers, at a level of about 2 to about 50 wt % of the copolymer and
optionally one or more monofunctional monomers, at a level up to about 10 wt % of the copolymer,
wherein the sulfur, the one or more polyfunctional monomers and the optional one or more monofunctional monomers are present at a level of at least about 70 wt % of the copolymer.

16. The polymeric composition according to claim 15, wherein the sulfur, the one or more polyfunctional monomers and the optional one or more monofunctional monomers are present at a level of at least about 85 wt % of the copolymer.

17. The polymeric composition according to claim 1, wherein the copolymer comprises
sulfur, at a level in the range of about 70 to about 92 wt % of the copolymer;
further includes one or more polyfunctional monomers selected from the group consisting of a divinylbenzene, and an alkylene di(meth)acrylate, at a level in the range of about 8 to about 30 wt % of the copolymer;
optionally one or more monofunctional monomers, at a level up to about 1.5 wt % of the sulfur; and
optionally triphenylphosphine, at a level up to about 20 wt % of the sulfur.

18. The polymeric composition according to claim 1, in the form of a polymeric composite comprising the copolymer and an elemental carbon material dispersed in the copolymer at a level in the range of up to about 50 wt % of the composition.

19. The polymeric composition according to claim 18, wherein the polymeric composition includes the copolymer, pyrene at a level in the range of about 10 to about 45 wt % of the sulfur of the copolymer, and the elemental carbon material at a level up to about 40 wt % of the sulfur of the copolymer.

20. The polymeric composition according to claim 1, in the form of a polymeric composite comprising the copolymer and inorganic nanoparticles dispersed in the copolymer.

21. A method for making a polymeric composition according to claim 1, the method comprising heating a mixture comprising sulfur and one or more monomers of diisopropenyl benzene at a temperature in the range of about 120° C. to about 230° C.

22. The method according to claim 21, wherein the mixture comprising sulfur and one or more monomers is formed by first heating a mixture comprising sulfur to form a molten sulfur, then adding one or more monomers of diisopropenyl benzene to the molten sulfur.

23. The method according to claim 22, wherein the molten sulfur is formed by heating a mixture comprising sulfur and a monofunctional monomer, a nucleophilic viscosity modifier, or a combination thereof.

24. The method according to claim 21, wherein the molten sulfur is formed by heating a mixture comprising sulfur and an elemental carbon material.

25. A method of making an article formed from the polymeric composition of claim 1, the method comprising heating a mixture comprising sulfur and one or more monomers of diisopropenyl benzene at a temperature in the range of about 160° C. to about 230° C. to form a prepolymer;

forming the prepolymer into the shape of the article, to yield a formed prepolymer shape; and further heating the formed prepolymer shape to yield the article.

26. The method according to claim 25, wherein the prepolymer is provided as a mixture with a solvent for forming.

27. The method according to claim 25, wherein the prepolymer is coated and cured as a thin film on a substrate.

28. The method according to claim 25, wherein the prepolymer is shaped and cured using a mold.

29. A method of forming an article formed from the polymeric composition of claim 1, the method comprising admixing the polymeric composition in a nonpolar organic solvent, forming the admixed polymeric composition into the shape of the article; and removing the solvent from the polymeric composition to yield the article.

30. An oil-in-water emulsion comprising the polymeric composition according to claim 1 as the colloidal phase suspended in aqueous solution with a surfactant.

31. An optical element comprising the polymeric composition of claim 1 formed as a substantially optically transparent body.

32. The optical element according to claim 31, wherein the polymeric composition has a refractive index in the range of about 1.7 to about 2.2 at at least one wavelength in the range of about 300 nm to about 1500 nm.

33. An electrochemical cell comprising
an anode comprising metallic lithium;
a cathode comprising the polymeric composition of claim 1; and
a non-aqueous electrolyte interposed between the cathode and the anode.

34. The electrochemical cell according to claim 33, wherein the cathode is flexible.

35. The electrochemical cell according to claim 33, having a capacity in the range of about 200 to about 1400 mAh/g.

36. The electrochemical cell according to claim 33, having a capacity in the range of about 600 to about 1000 mAh/g.

* * * * *